US012059738B2

(12) United States Patent
Zhou et al.

(10) Patent No.: US 12,059,738 B2
(45) Date of Patent: Aug. 13, 2024

(54) HAND-HELD BAND SAW

(71) Applicant: Nanjing Chervon Industry Co., Ltd., Nanjing (CN)

(72) Inventors: Yang Zhou, Nanjing (CN); Guanhai Shao, Nanjing (CN); Masatoshi Fukinuki, Nanjing (CN); Hao Gao, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 254 days.

(21) Appl. No.: 17/719,039

(22) Filed: Apr. 12, 2022

(65) Prior Publication Data
US 2022/0234123 A1 Jul. 28, 2022

Related U.S. Application Data

(63) Continuation of application No. PCT/CN2020/125275, filed on Oct. 30, 2020.

(30) Foreign Application Priority Data

Oct. 30, 2019 (CN) .......................... 201911042715.2
Oct. 30, 2019 (CN) .......................... 201911042736.4
(Continued)

(51) Int. Cl.
*B23D 53/12* (2006.01)
*B25F 5/02* (2006.01)

(52) U.S. Cl.
CPC .............. *B23D 53/12* (2013.01); *B25F 5/021* (2013.01)

(58) Field of Classification Search
CPC ........ B23D 53/12; B23D 53/04; B23D 55/08; B23D 55/00; B23D 1/54; B23D 55/082;
(Continued)

(56) References Cited

U.S. PATENT DOCUMENTS 4,001,937 A * 1/1977 Stelljes ................. B23D 55/10
30/380
6,829,830 B2 * 12/2004 O'Banion ............. B23D 53/12
83/745
(Continued)

FOREIGN PATENT DOCUMENTS

CN       2664824 Y    12/2004
CN       1676255 A    10/2005
(Continued)

OTHER PUBLICATIONS

ISA/CN, International Search Report issued on PCT application No. PCT/CN2020/125275, dated Jan. 27, 2021, 5 pages.
(Continued)

*Primary Examiner* — Ghassem Alie
(74) *Attorney, Agent, or Firm* — Greenberg Traurig, LLP

(57) ABSTRACT

A hand-held band saw includes a band saw body and an supporting device. The supporting device includes a fixing member, a slider, a supporting member, and a connection assembly. The fixing member is fixedly connected to the band saw body, the slider is slidably connected to the fixing member, the supporting member supports a workpiece and is connected to the slider, and the connection assembly connectes the slider and the supporting member. When the slider moves, the connection assembly is capable of enabling the supporting member to move along with the slider. The connection assembly comprises a buffer member mounted between the slider and the supporting member.

20 Claims, 19 Drawing Sheets

(30) Foreign Application Priority Data

Oct. 30, 2019 (CN) .......................... 201911042738.3
Oct. 30, 2019 (CN) .......................... 201911042739.8

(58) Field of Classification Search
CPC . B25F 5/02; B25F 5/021; B27B 13/14; B27B 13/16; Y10T 83/7264
USPC ...................... 83/132, 830; 30/371, 375, 380
See application file for complete search history.

(56) References Cited

U.S. PATENT DOCUMENTS

| | | | |
|---|---|---|---|
| 8,763,258 B2* | 7/2014 | Miller | B23D 53/12 |
| | | | 83/522.15 |
| 2004/0158996 A1 | 8/2004 | McIntosh | |
| 2007/0068011 A1 | 3/2007 | Shibata | |
| 2008/0282556 A1 | 11/2008 | Mcintosh | |
| 2010/0018064 A1 | 1/2010 | Bertsch | |
| 2010/0287782 A1 | 11/2010 | Bertsch et al. | |
| 2014/0033548 A1* | 2/2014 | Bertsch | B23D 55/00 |
| | | | 30/375 |
| 2015/0231712 A1* | 8/2015 | Steele | B23D 53/12 |
| | | | 83/820 |
| 2020/0001382 A1* | 1/2020 | Kani | B23D 55/10 |
| 2023/0201936 A1* | 6/2023 | Sitter | B23D 55/065 |
| | | | 30/380 |

FOREIGN PATENT DOCUMENTS

| | | |
|---|---|---|
| CN | 2908064 Y | 6/2007 |
| CN | 102186615 A | 9/2011 |
| CN | 102380661 A | 3/2012 |
| CN | 203853627 U | 10/2014 |
| CN | 103038013 B | 6/2016 |
| CN | 104369168 B | 2/2017 |
| CN | 105290504 B | 6/2018 |
| CN | 208613900 U | 3/2019 |
| CN | 209272643 U | 8/2019 |
| CN | 209503113 U | 10/2019 |
| CN | 209520430 U | 10/2019 |
| CN | 110744134 A | 2/2020 |
| CN | 110744135 A | 2/2020 |
| CN | 110744136 A | 2/2020 |
| CN | 110744504 A | 2/2020 |
| CN | 108907343 B | 3/2020 |
| JP | 2004345041 A | 12/2004 |
| JP | 2006212807 A | 8/2006 |
| JP | 2015208831 A | 11/2015 |
| JP | 2016060011 A | 4/2016 |
| JP | 2018034251 A | 3/2018 |
| WO | 2008/144516 A1 | 11/2008 |

OTHER PUBLICATIONS

ISA/CN, English translation of International Search Report issued on PCT application No. PCT/CN2020/125275, dated Jan. 27, 2021, 3 pages.

ISA/CN, Written Opinion issued on PCT application No. PCT/CN2020/125275, dated Jan. 27, 2021, 4 pages.

ISA/CN, English translation of Written Opinion issued on PCT application No. PCT/CN2020/125275, dated Jan. 27, 2021, 4 pages.

* cited by examiner

HAND-HELD BAND SAW

RELATED APPLICATION INFORMATION

This application is a continuation of International Application Number PCT/CN2020/125275, filed on Oct. 30, 2020, through which this application also claims the benefit under 35 U.S.C. § 119(a) of Chinese Patent Application No. 201911042736.4, filed on Oct. 30, 2019, Chinese Patent Application No. 201911042739.8, filed on Oct. 30, 2019, Chinese Patent Application No. 201911042715.2, filed on Oct. 30, 2019, and Chinese Patent Application No. 201911042738.3, filed on Oct. 30, 2019, all of which are incorporated herein by reference in their entirety.

BACKGROUND

At present, the hand-held band saw is widely used, and can be used to cut all machinable metals including the stainless steel, pipes, solid bodies and the like. The hand-held band saw has a strong thermal resistance, wear resistance and vibration resistance, and has a longer service life compared with similar products. Because of its flexible and convenient use, the hand-held band saw has been widely used in scenarios of cutting various types of bars, pipes and profiles in industry and home.

To facilitate cutting, a supporting member for supporting the workpiece is disposed on a cutting side edge of the workpiece cut by the saw blade. When cutting, the user can support the cut workpiece by adjusting the height of the supporting member, but the supporting member configured on the band saw products on the market needs an external tool when adjusting the height, which is insufficient in convenience and experience of use.

On the other hand, during the running process of the tool, the supporting member falls or collides with the object rigidly, resulting in the stress collapse, enabling the supporting member to return to an original position, or directly leading to the damage of the supporting member, thereby affecting the working efficiency.

SUMMARY

A hand-held band saw includes: a housing assembly, a first rotation wheel, a second rotation wheel, a motor. The housing assembly includes a first housing, a second housing spaced from the first housing, and a third housing connecting the first housing to the second housing, where a cutting area is formed between the first housing and the second housing. The first rotation wheel is at least partially disposed on the first housing. The second rotation wheel is at least partially disposed on the second housing. The motor is disposed in the housing assembly and is capable of driving one of the first rotation wheel and the second rotation wheel to rotate. The hand-held band saw further includes: an supporting device. The supporting device is connected to the first housing and is at least partially disposed in the cutting area. The supporting device includes: a fixing member, a slider, a supporting member, a connection assembly and a buffer member. The fixing member is fixedly connected to the first housing. The slider is slidably connected to the fixing member. The supporting member is connected to the slider. The connection assembly connects the slider and the supporting member. When the slider moves, the connection assembly is capable of enabling the supporting member to move along with the slider. The buffer member is mounted between the slider and the supporting member.

A hand-held band saw includes: a housing assembly, a first rotation wheel, a second rotation wheel, a motor. The housing assembly includes a first housing, a second housing spaced from the first housing, and a third housing connecting the first housing to the second housing, where a cutting area is formed between the first housing and the second housing. The first rotation wheel is at least partially disposed on the first housing. The second rotation wheel is at least partially disposed on the second housing. The motor is disposed in the housing assembly and is capable of driving one of the first rotation wheel and the second rotation wheel to rotate. The hand-held band saw further includes: an supporting device. The supporting device is connected to the first housing and is at least partially disposed in the cutting area. The supporting device includes: a fixing member, a slider, a supporting member, a connection assembly and a buffer member. The fixing member is fixedly connected to the first housing. The slider is slidably connected to the fixing member. The supporting member is connected to the slider. The connection assembly connects the slider and the supporting member. When where the slider moves, the connection assembly is capable of enabling the supporting member to move along with the slider. The control assembly is mounted to the slider; and the control assembly is connected to the fixing member and is configured to prevent the slider from disengaging from the fixing member.

A hand-held band saw includes: a housing assembly, a first rotation wheel, a second rotation wheel, a motor. The housing assembly includes a first housing, a second housing spaced from the first housing, and a third housing connecting the first housing to the second housing, where a cutting area is formed between the first housing and the second housing. The first rotation wheel is at least partially disposed on the first housing. The second rotation wheel is at least partially disposed on the second housing. The motor is disposed in the housing assembly and is capable of driving one of the first rotation wheel and the second rotation wheel to rotate. The hand-held band saw further includes: an supporting device. The supporting device is connected to the first housing and is at least partially disposed in the cutting area. The supporting device includes: a fixing member, a slider, a supporting member, a connection assembly and a buffer member. The fixing member is fixedly connected to the first housing. The slider is slidably connected to the fixing member. The supporting member is connected to the slider, and is capable of being released and fixedly connected to the fixing member. The buffer member is mounted between the slider and the supporting member. The supporting member is capable of being driven to move between a first position and a second position in a first sliding direction, the supporting member is capable of being released and fixed at any one position between the first position and the second position, when the supporting member is fixed at any one position and moves to a third position under a force, the buffer member is capable of generating a buffer force opposite to a moving direction, and the buffer force is capable of enabling the supporting member to return to the any one position from the third position.

DETAILED DESCRIPTION

Figure 1:
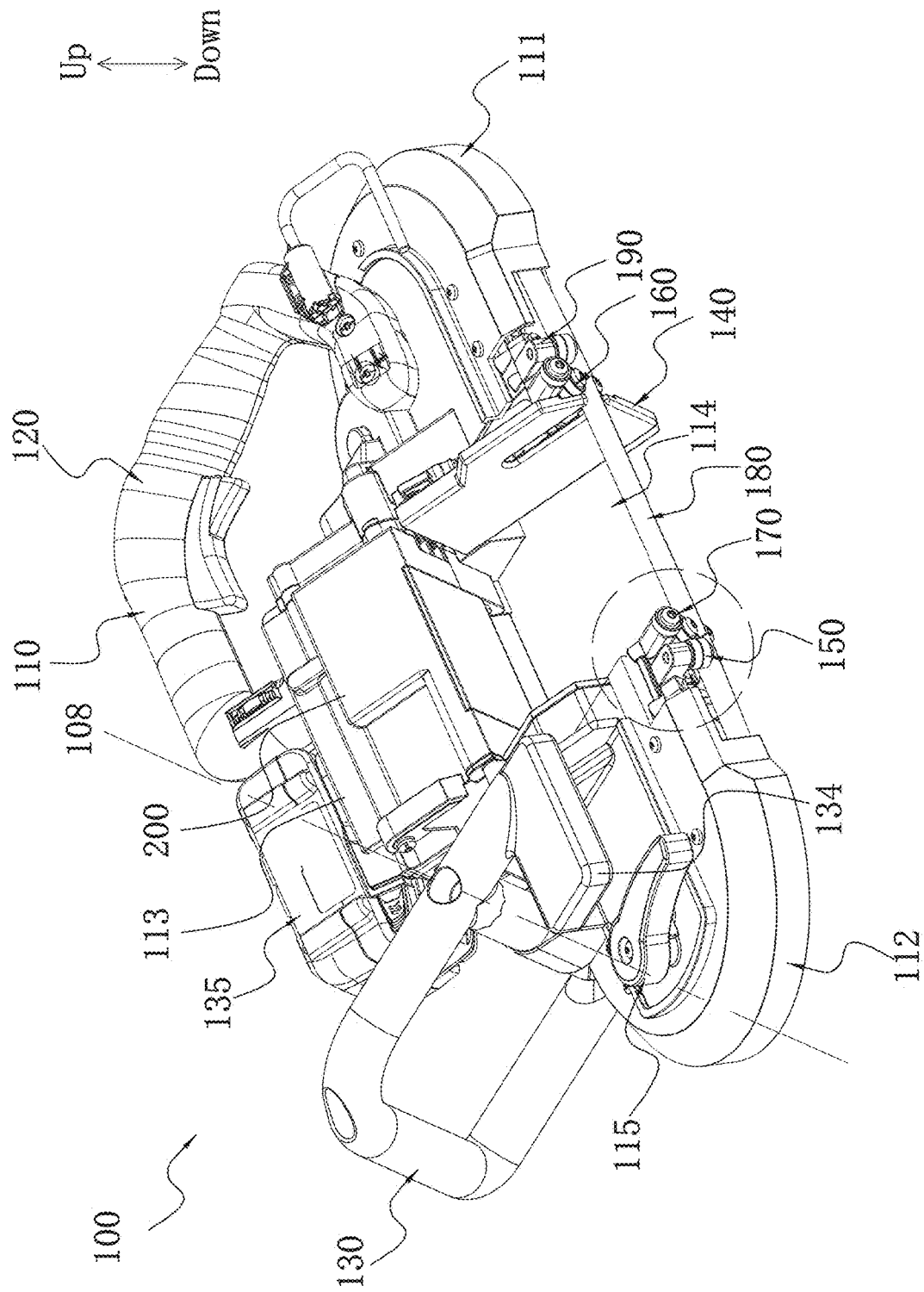
FIG. 1 is a three-dimensional structural view of a hand-held band saw in a second direction.
Figure 2:
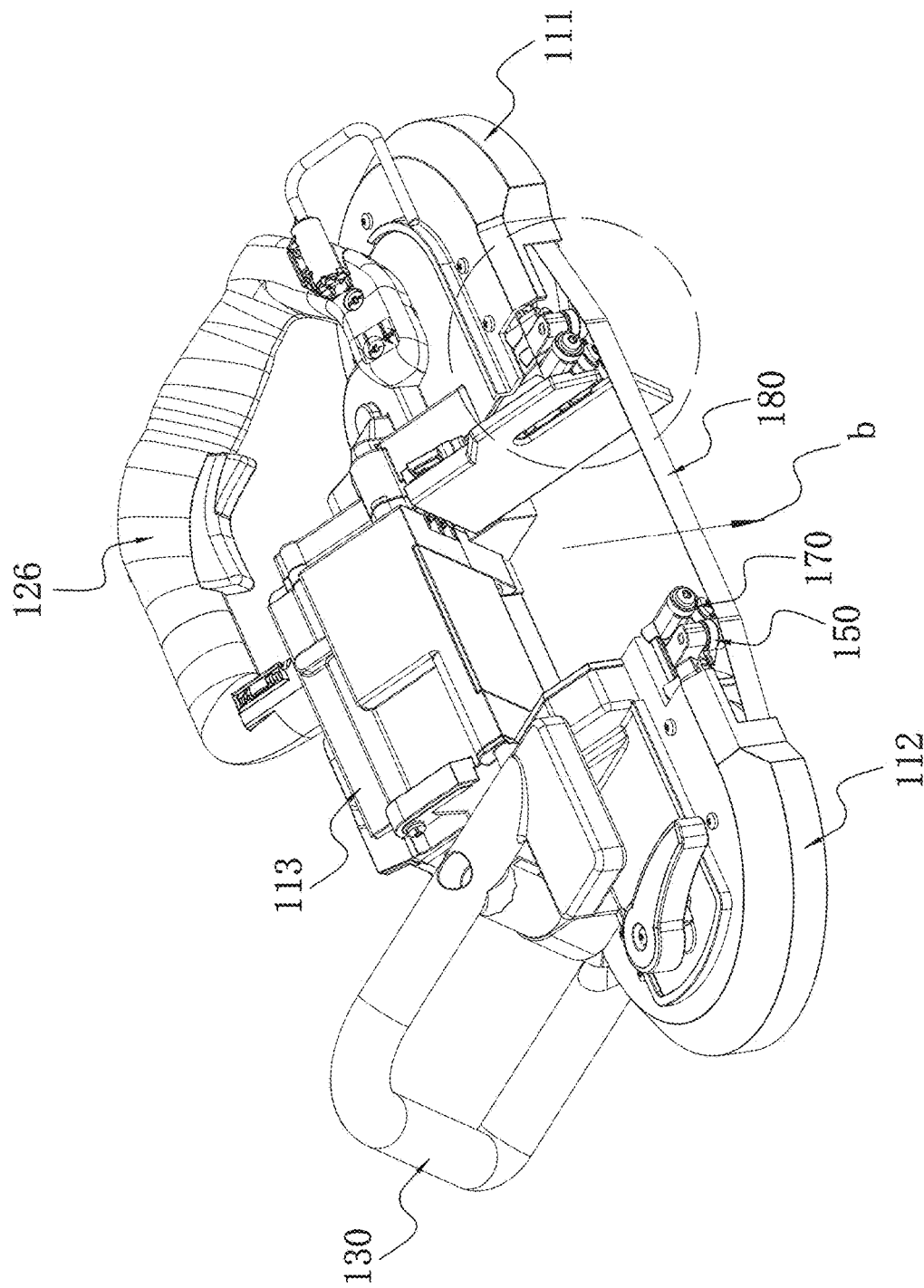
FIG. 2 is a three-dimensional structural view of the hand-held band saw as shown in FIG. 1 in a first direction.
Figure 3:
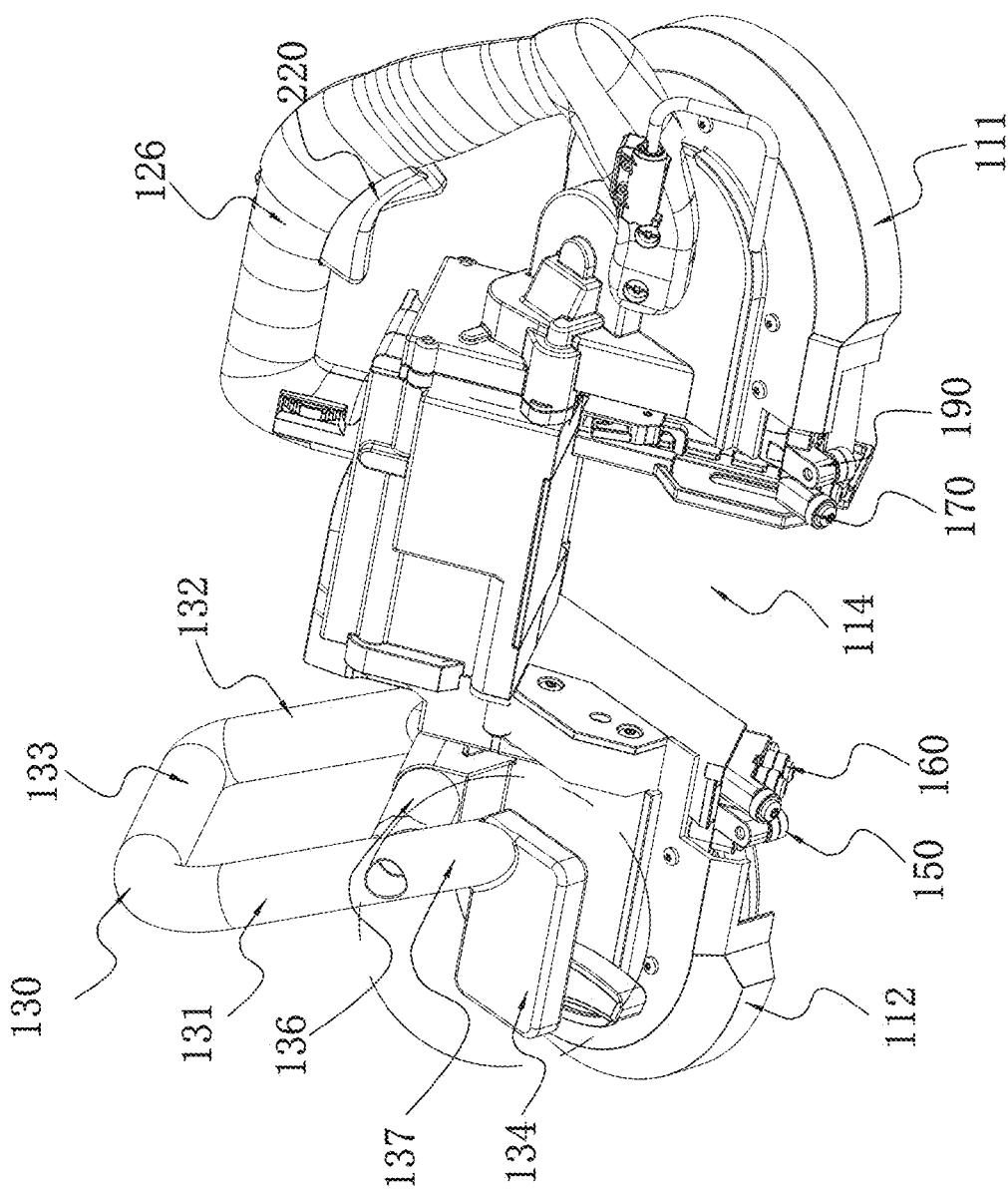
FIG. 3 is a three-dimensional structural view of the hand-held band saw as shown in FIG. 1 from another perspective.

To clearly illustrate the technical solution of the present application, front and rear as shown in FIG. 1 are defined.

Referring to FIG. 1, an example of the present application provides an electric tool, specifically, a hand-held band saw 100, which can be mounted with a saw blade 180 and drive the saw blade 180 to move so as to achieve the function of cutting a workpiece.

Referring to FIGS. 1 to 4, the hand-held band saw 100 of the present application includes: a housing assembly 110, a first rotation wheel 116, a second rotation wheel 117, a motor 200, a handle 120, a saw blade 180 and a battery pack 135.

The housing assembly 110 forms an accommodation space for accommodating various parts inside the hand-held band saw 100. The housing assembly 110 includes a first housing 111, a second housing 112 and a third housing 113. The first housing 111 is spaced from the second housing 112, the third housing 113 connects the first housing 111 and the second housing 112, and the third housing 113, the first housing 111 and the second housing 112 are fixedly connected or integrally formed. A cutting area 114 is formed between the first housing 111 and the second housing 112. The first housing 111 is formed with a first housing surface 1112, and the second housing 112 is formed with a second housing surface 1122. The handle 120 is connected to the housing assembly 110 and configured for the user to grip. Both ends of the handle 120 are fixedly connected to the first housing surface 1112 and the third housing 113 respectively. Of course, both ends of the handle 120 may also be integrally formed with the first housing surface 1112 and the third housing 113 respectively.

The motor 200 is configured to provide a power source to the hand-held band saw 100 and is at least partially disposed within the housing assembly 110.

A first rotation wheel 116 and a second rotation wheel 117 are at least partially disposed within the accommodation space. The first rotation wheel 116 and the second rotation wheel 117 are disposed on a lower side of the first housing surface 1112 and a lower side of the second housing surface 1122 respectively. The handle 120 is located on an upper side of the first housing surface 1112, and the motor 200 is able to drive the first rotation wheel 116 and/or the second rotation wheel 117 to rotate. That is, the motor 200 drives the first rotation wheel 116 to rotate, or the motor 200 may drive the second rotation wheel 117 to rotate, or of course, the motor 200 may drive the first rotation wheel 116 and the second rotation wheel 117 to rotate. In this example, the first rotation wheel 116 is disposed in the first housing 111, the second transmission wheel 117 is disposed in the second housing 112, and the motor 200 drives the first rotation wheel 116 to rotate with respect to the first housing 111 about a first central axis 101. That is, the first rotation wheel 116 is configured to transmit power output by the motor 200 to the saw blade 180.

The saw blade 180 is connected to the first rotation wheel 116 and the second rotation wheel 117. That is, when the first rotation wheel 116 transmits the power output by the motor 200 to the saw blade 180, the saw blade 180 drives the second rotation wheel 117 to rotate with respect to the second housing 112 about the second central axis 102.

The battery pack 135 is mounted to the housing assembly 110 and is configured to provide an energy source to the hand-held band saw 100. In this example, the battery pack 135 is installed on the third housing. Specifically, the battery pack 135 has a connection port which is cooperated with a connection seat disposed on the third housing 113 to achieve the energy transmission.

The saw blade 180 connects the first rotation wheel 116 and the second rotation wheel 117.

Referring to FIGS. 1, 11 to 15, the hand-held band saw 100 also includes an supporting device 140 connected to the housing assembly 110. Specifically, the supporting device 140 is connected to the first housing 111 and is at least partially disposed in the cutting area 114. The supporting device 140 includes a fixing member 141, a slider 142, a supporting member 143 and a connection assembly 144. The fixing member 141 is fixedly connected to the first housing 111. In this example, the fixing member 141 is provided with multiple through holes 1411 through which screws are fixed to the first housing 111. The slider 142 is slidably connected to the fixing member 141, that is, it can be understood that the slider 142 is capable of reciprocating with respect to the fixing member 141 in a first sliding direction a. The supporting member 143 is configured to abut against the cut workpiece. The supporting member 143 is connected to the slider 142 through the connection assembly 144, and the connection assembly 144 is fixedly connected to the slider 142, that is, it can be understood that when the slider 142 moves, the supporting member 143 is able to move with the slider 142 so that the supporting member 143 is in different positions in the first sliding direction a, and a height of the supporting member 143 is adjusted by the slider 142 to cooperate with different workpieces.

Figure 13:
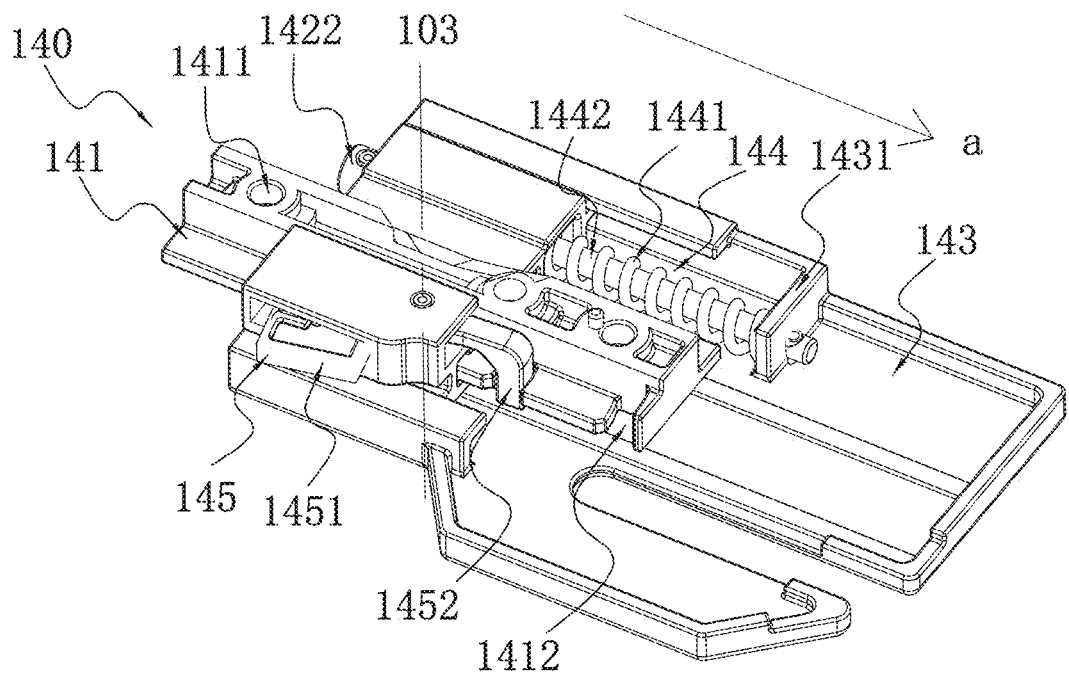
FIG. 13 is a structural view illustrating that the supporting device of the hand-held band saw as shown in FIG. 1 is in an intermediate position.
Figure 14:
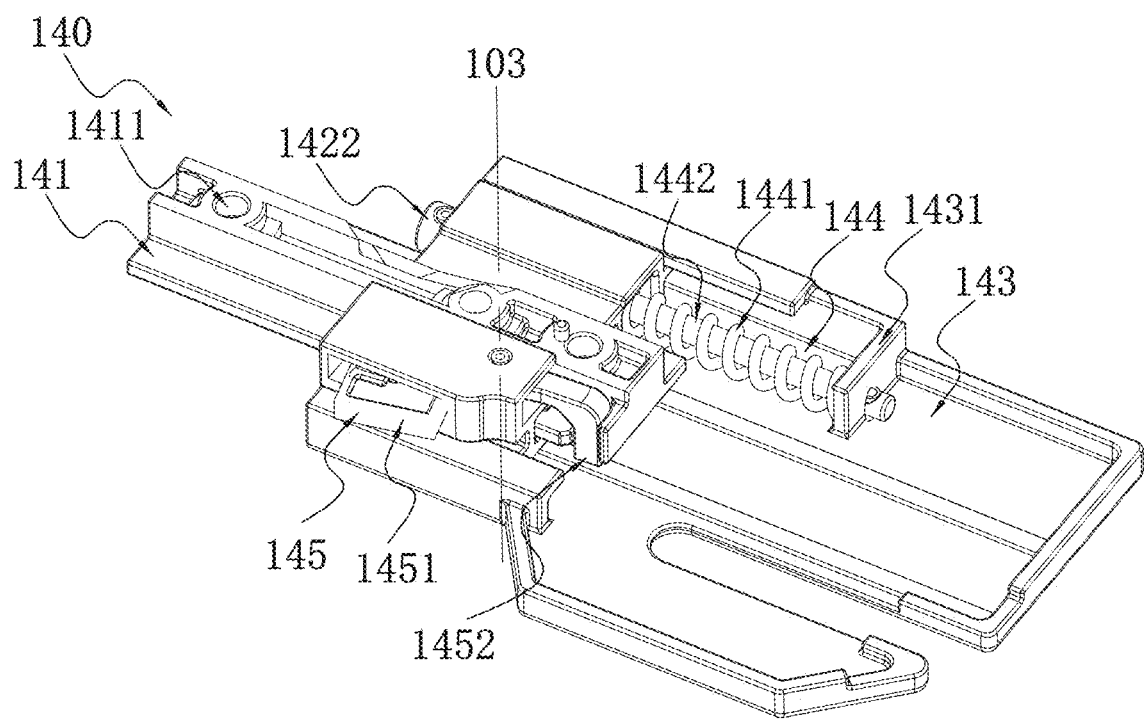
FIG. 14 is a structural view illustrating that the supporting device of the hand-held band saw as shown in FIG. 1 is in a second position.

The supporting device 140 further includes a control assembly 145. The control assembly 145 is configured to drive the slider 142 to move the supporting member 143 which, when moving in the first sliding direction a, is able to move to at least two positions. That is, the supporting member 143 is able to move a first position and a second position separately, and is able to move between the first position and the second position. Of course, there may also be one or multiple intermediate positions between the first position and the second position according to different working conditions. Specifically, the control assembly 145 drives the slider 142 to move the supporting member 143 between the first position and the second position, or to keep the supporting member 143 at the first position, the second position, or the intermediate position. The fixing member 141 is provided with multiple grooves 1412. The control assembly 145 includes an operation member for a user to operate, the operation member is a control button 1451, a stopper 1452 and an elastic member 1453. The elastic member 1453 is connected to the control button 1451. In this example, the elastic member 1453 may be a spring. The control button 1451 is configured to be operated by the user. When the control button 1451 is in an original state and the stopper 1452 is cooperated with the groove 1412, the supporting member 143 is relatively fixed at a certain position among the intermediate positions the first position, or the second position. The original state refers to a state of the control button 1451 when the spring is unstressed to be deformed. When the user presses the control button 1451, the stopper 1452 is disengaged from the groove 1412, and the slider 142 is able to move freely with respect to the fixing member 141. When the control button 1451 loses the external force, the control button 1451 is able to be restored to the original state under the action of the elastic member 1453. Specifically, the control button 1451 and the stopper 1452 are integrally formed and rotated about the rotary axis 103. In some examples, the control button 1451 may also be fixedly connected to the stopper 1452 and rotated about the rotary axis 103. In this example, in a case where the supporting member 143 is in the first position, on the premise that the stopper 1452 is clamped with the groove 1412, the supporting member 143 is kept at a position closest to the third housing 113 in the first sliding direction a. In a case where the supporting member 143 is in the second position, on the premise that the stopper 1452 is clamped with the groove 1412, the supporting member 143 is kept at a position farthest from the third housing 113 in the first sliding direction a, in this case, the supporting member 143 is configured to cooperate with the workpiece having a large size. The intermediate position refers to a position between the first position and the second position and where the stopper 1452 is clamped with the groove 1412 (as shown in FIG. 13). In this application, the intermediate position is not forcibly defined between the first position and the second position, and the stopper 1452 may also be disengaged from the groove 1412 when the supporting member 143 is at the intermediate position. When the user presses the control button 1451, the user may adjust the supporting member 143 to any one position of the intermediate positions, the first position, or the second position. Therefore, the height of the supporting member 143 may be adjusted by changing a corresponding relation between the control button 1451 and different grooves 1412 without the assistance of the external tool, which is more convenient and experiential.

Figure 15:
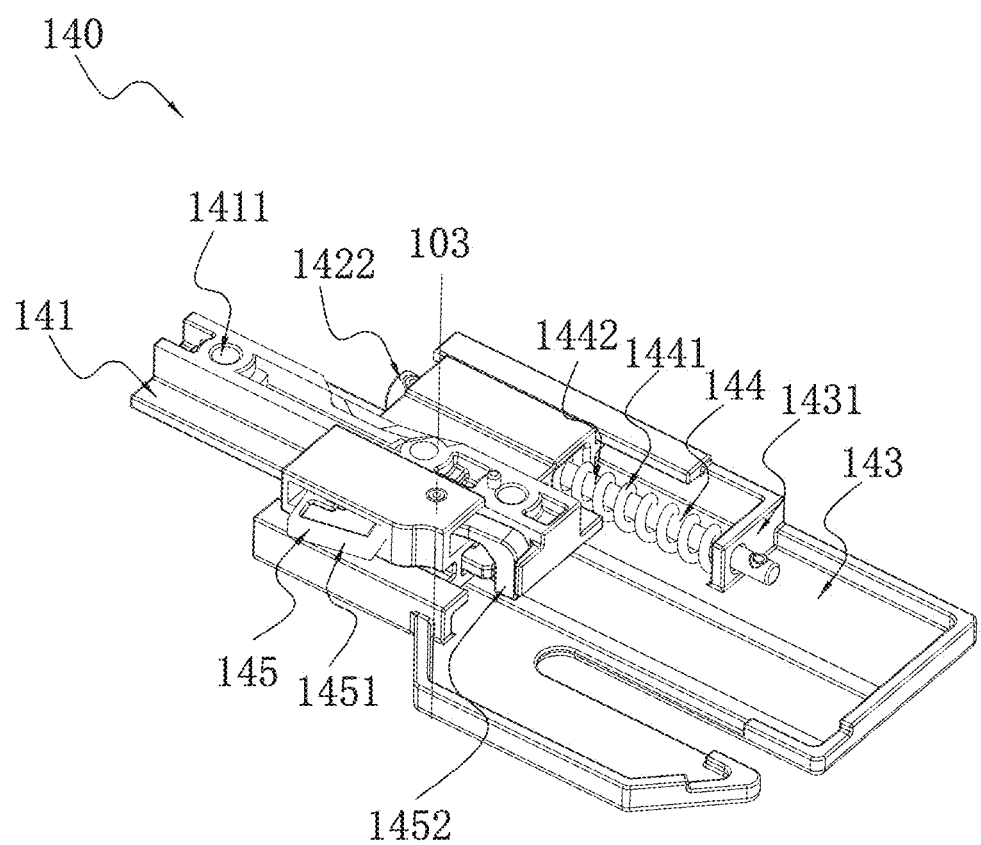
FIG. 15 is a structural view illustrating that the supporting device of the hand-held band saw as shown in FIG. 1 is in a state of stress collapse.

Referring to FIG. 15, in a case where the supporting member 143 is in the intermediate position and the hand-held band saw 100 is accidentally dropped, the supporting member 143 contacts the ground or other objects, the supporting member 143 is subjected to a relatively large external force, and the supporting member 143 moves in a direction facing toward the third housing 113 in the first sliding direction a, that is, the supporting member 143 moves from the intermediate position to a third position, thereby avoiding the direct rigid collision between the supporting member 143 and the ground or other objects, and further avoiding the drop damage of the hand-held band saw 100. When the supporting member 143 is in the third position and the external force applied to the supporting member 143 disappears, the connection assembly 144 is able to generate a buffer force opposite to a moving direction so as to move the supporting member 143 from the third position to the intermediate position, thereby avoiding that the user adjusts the supporting member 143 again and improving the operation convenience. The third position is between the first position and the second position. The third position refers to the farthest position at which the supporting member 143 can move from the intermediate position toward the third housing 113 when a relatively large external force is applied. Since the magnitude of the external force applied each time is uncertain, the specific position of the third position is uncertain.

The connection assembly 144 includes a buffer member 1441 for resetting the supporting member 143. The buffer member 1441 is disposed between the slider 142 and the supporting member 143 and disposed in a direction parallel to the first sliding direction a. Specifically, the slider 142 has an accommodation slot 1421 and a connection portion 1422. The connection portion 1422 is disposed on one side of the accommodation groove 1421. The buffer member 1441 is at least partially disposed in the accommodation groove 1421. One end of the buffer member 1441 is connected to the connection portion 1422, and the other end of the buffer member 1441 is connected to the supporting member 143. Since the buffer member 1441 is provided, when the supporting member 143 falls or rigidly collides with the object and contracts, the supporting member 143 may slide to a certain extent in a contraction direction, thereby achieving the purpose of preventing the supporting member from falling and the control assembly 145 from falling and being damaged.

The connection assembly 144 also includes a guide rod 1442 disposed in a first direction and fixedly connected to the slider 142 such that the guide rod 1442 can move along with the slider 142 when the slider 142 moves. Specifically, a pin may be used to connect the slider 142 and one end of the guide rod 1442. Of course, the guide rod 1442 and the slider 142 are fixedly connected in other means. For example, external threads are provided on one end of the guide rod 1442, internal threads are provided in the connection portion 1422, and the guide rod 1442 and the connection portion 1422 are threadedly connected. The other end of the guide rod 1442 is movably connected to the supporting member 143 for limiting the supporting member 143 from being disengaged from the guide rod 1442 and moving freely. The supporting member 143 is provided with a protrusion 1431. The protrusion 1431 extends in a direction perpendicular to the first sliding direction a, and the other end of the guide rod 1442 passes through the protrusion 1431 and cooperates with the pin so that the protrusion 1431 cannot be disengaged from the guide rod 1442. In this application, the buffer member 1441 may specifically be a spring sleeved on the guide rod 1442. One end of the spring abuts against the guide rod 1442 and the other end of the spring abuts against the protrusion 1431. The improved supporting device 140 has advantages of simple structure, low production cost and convenient operation.

Referring to FIGS. 1 to 5, the hand-held band saw 100 also includes a first guide mechanism 150 and a stop mechanism 170. The first guide mechanism 150 is configured to guide the saw blade 180 to move in a first cutting direction b within the cutting area 114. The stop mechanism 170 is configured to prevent the saw blade 180 from passing over a predetermined position, avoiding that the saw blade 180 is unable to cut normally, and supporting the saw blade 180 so as to ensure the normal operation of the machine.

The first guide mechanism 150 is connected to the housing assembly 110. The first guide mechanism 150 includes a first guide assembly 151 and a second guide assembly. Specifically, the first guide assembly 151 is mounted to the first housing 111 and the second guide assembly 152 is mounted to the second housing 112. The first guide assembly 151 and the second guide assembly 152 are cooperated with each other so that the saw blade 180 is moved in the first cutting direction b within the cutting area 114.

When the hand-held band saw 100 works, that is, when the saw blade 180 in the cutting area 114 moves in the first cutting direction b, the saw blade 180 moves from a first cutting position to a second cutting position, and the stop mechanism 170 stops the saw blade 180 from passing over the second cutting position. The first cutting position refers to a position at which the saw blade 180 is mounted on the first guide mechanism 150. The second cutting position refers to the predetermined position, i.e., a position at which the saw blade 180 can move on the first guide mechanism 150 under the action of the stop mechanism 170 and closest to the stop mechanism 170. In actual use, the first cutting position is not fixed. Of course, there is a case where the first cutting position coincides with the second cutting position, that is, an initial position of the saw blade 180 on the first guide mechanism 150 is the second cutting position at which the saw blade 180 is located. The above design is used for preventing the saw blade 180 from continuously shifting when moving so as to prevent the saw blade 180 from passing over the second cutting position, ensure the normal use of the hand-held band saw 100, and avoid that the disengagement of the saw blade 180 causes the equipment failure, affects the normal operation of the equipment, increases the cost of the subsequent repairment and maintenance, and slows down the working efficiency.

Figure 16:
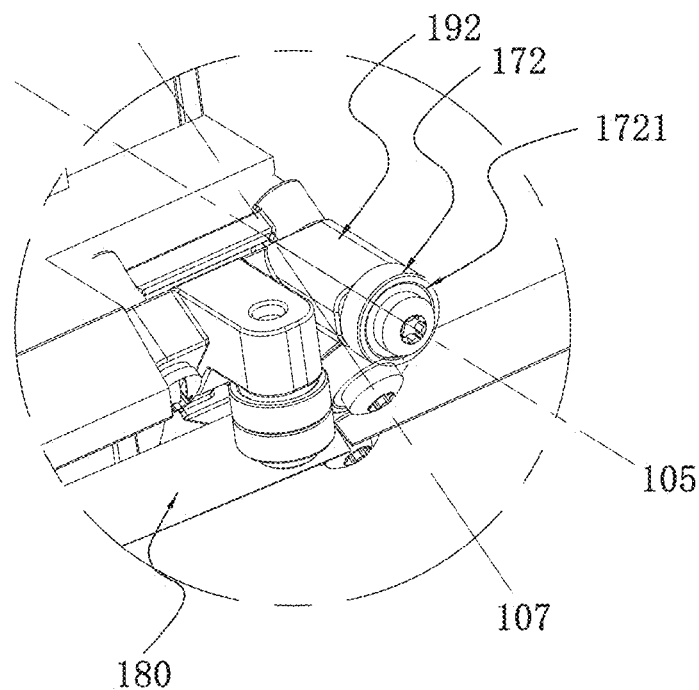
FIG. 16 is a partial enlarged view of FIG. 1.
Figure 17:
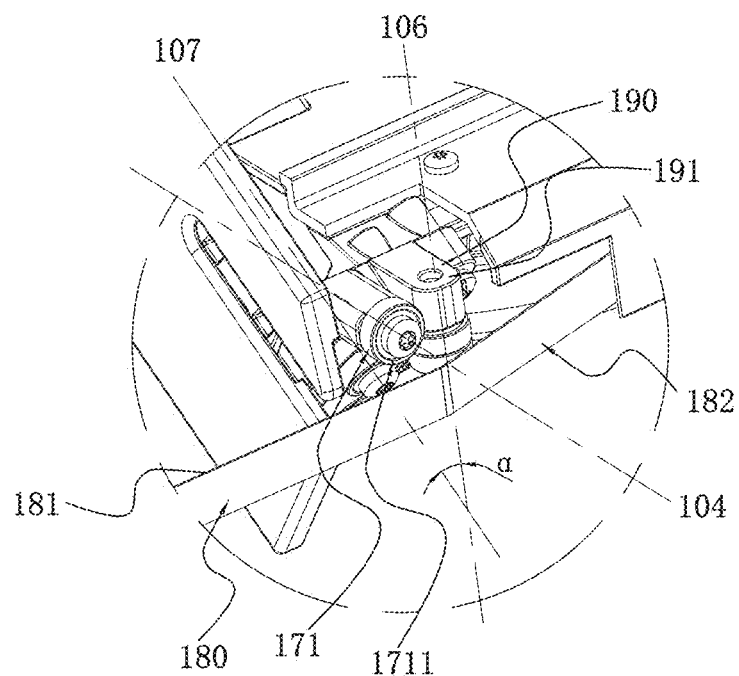
FIG. 17 is a partial enlarged view of FIG. 2.
Figure 18:
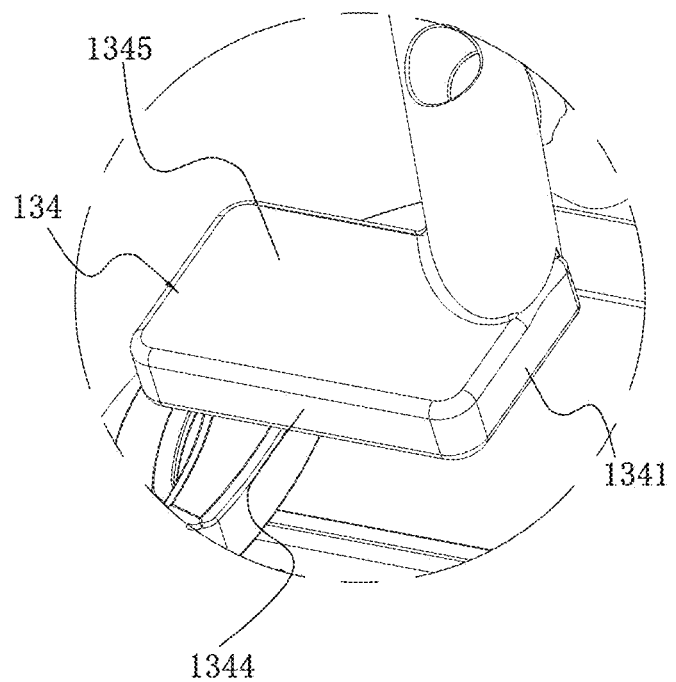
FIG. 18 is a partial enlarged view of FIG. 3.
Figure 19:
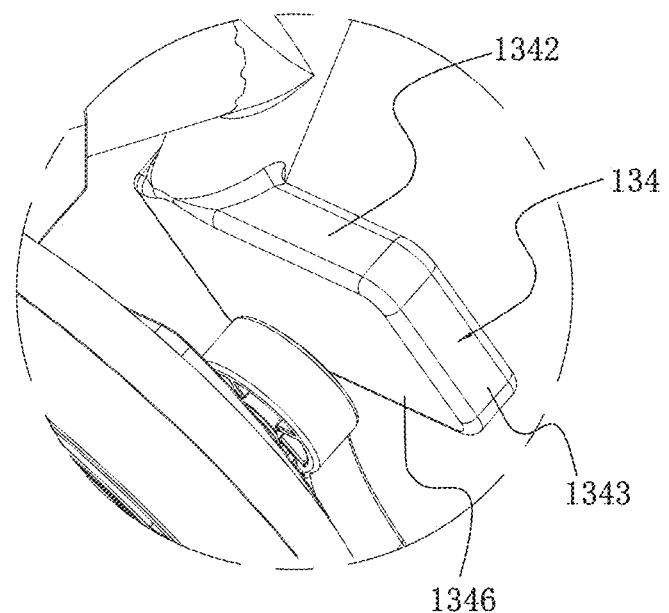
FIG. 19 is a partial enlarged view of FIG. 4.
Figure 20:
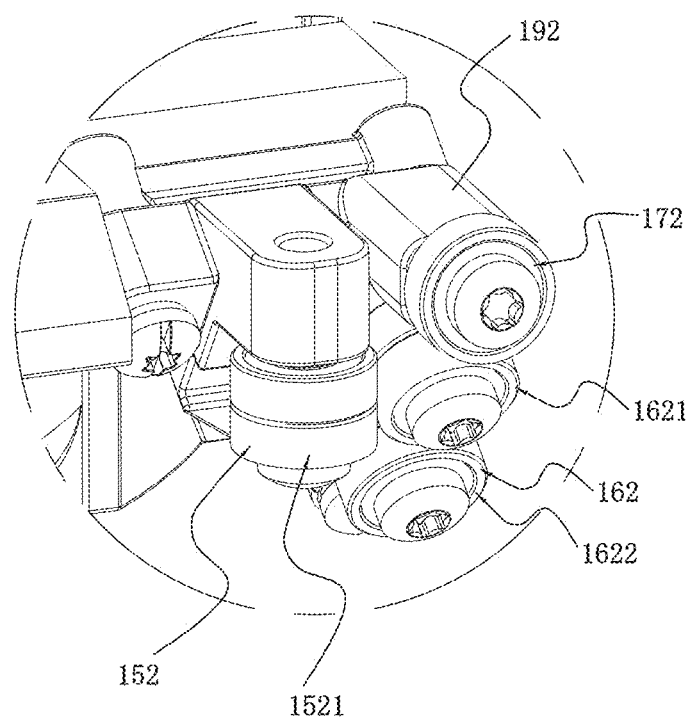
FIG. 20 is a partial enlarged view of FIG. 7.

Referring to FIGS. 16 and 17, the stop mechanism 170 includes a first stopper 171 and a second stopper 172. The first stopper 171 is connected to the first housing 111 and is rotatable about a first rotary axis 104, and the second stopper 172 is connected to the second housing 112 and is rotatable about a second rotary axis 105 parallel to the first rotary axis 104. When the saw blade 180 is at the second cutting position, that is, when the saw blade 180 is in contact with the first stopper 171 and the saw blade 180 is also in contact with the second stopper 172, at least part of the saw blade 180 at a position in contact with the first stopper 171 intersects a direction of the first rotary axis 104, and at least part of the saw blade 180 at a position in contact with the second stopper 172 intersects a direction of the second rotary axis 105, that is, it can be understood that the saw blade 180 at the position where the first stopper 171 is in contact with the saw blade 180 intersects the direction of the first rotary axis 104, and the saw blade 180 at the position where the second stopper 172 is in contact with the saw blade 180 intersects the direction of the second rotary axis 105. Similarly, the saw blade 180 at the position where the first stopper 171 is in contact with the saw blade 180 is also perpendicular to the direction of the first rotary axis 104, and the saw blade 180 at the position where the second stopper 172 is in contact with the saw blade 180 is perpendicular to the second rotary axis 105. As an optional example, the saw blade 180 includes a saw back 181, a saw edge (not shown in the figure), a first side surface (not shown in the figure), and a second side surface 182. The saw back 181 is disposed opposite to the saw edge for cutting the workpiece, the first side surface is disposed opposite to the second side surface 182, and the first side surface is at least partially in contact with the first guide mechanism 150. When the saw blade 180 is in the second cutting position, the saw back 181 is at least partially in contact with the first stopper 171; in this case, the second side surface 182 at the position where the saw back 181 is in contact with the first stopper 171 is substantially parallel to a first surface 1711 of the first stopper 171, the saw back 181 is at least partially in contact with the second stopper 172, and the second side surface 182 at the position where the saw back 181 is in contact with the second stopper 172 is also substantially parallel to a second surface 1721 of the second stopper 172. In this way, the machine can be better kept running stably. As another optional example, when the saw blade 180 is in the second cutting position, the saw back 181 is at least partially in contact with the first stopper 171 and a plane passing through the first stopper 171 and perpendicular to the first rotary axis 104 is substantially parallel to the second side surface 182 at the position where the saw back 181 is in contact with the first stopper 171, the saw back 181 is in contact with the second stopper 172 and a plane passing through the second stopper 172 and perpendicular to the second rotary axis 105 is substantially parallel to the second side surface 182 at the position where the saw back 181 is in contact with the second stopper 172.

The hand-held band saw 100 also includes a second guide mechanism 160 configured to guide the saw blade 180 to move in a second cutting direction within the cutting area 114, and the second guide mechanism 160 is connected to the housing assembly 110. Specifically, the second guide mechanism 160 includes a third guide assembly 161 and a fourth guide assembly 162. The third guide assembly 161 is connected to the first housing 111, the fourth guide assembly 162 is connected to the second housing 112, and the third guide assembly 161 and the fourth guide assembly 162 cooperate with each other to enable the saw blade 180 to move in the second cutting direction c within the cutting area 114. A set of guide mechanisms is added, so that the user can adjust the assembly mode as needed in the actual operation, and the hand-held band saw 100 has different cutting paths. In a special case where the conventional hand-held band saw 100 cannot cut or is inconvenient to cut, the cutting path is changed to change the angle of the saw blade 180 so as to ensure the cutting operation is performed smoothly.

The first rotation wheel 116 and the second rotation wheel 117 are disposed substantially symmetrically with respect to a plane P2 passing through the cutting area 114. The first housing 111 and the second housing 112 are disposed substantially symmetrically with respect to the plane P2. The first guide assembly 151 and the second guide assembly 152 are disposed substantially symmetrically with respect to the plane P2, the third guide assembly 161 and the fourth guide assembly 162 are disposed substantially symmetrically with respect to the plane P2, and the first stopper 171 and the second stopper 172 are disposed substantially symmetrically with respect to the plane P2.

Referring to FIGS. 6, 7, 20 and 21, the first guide assembly 151 includes a first guide member 1511 and the second guide assembly 152 includes a second guide member 1521. The first guide member 1511 rotates about a first rotation axis 106 and the first rotation axis 106 intersects the first rotary axis 104. Since the first guide assembly 151 and the second guide assembly 152 are disposed substantially symmetrically with respect to the plane P2, the second guide member 1521 rotates in a direction parallel to the first rotation axis 106, and the first rotation axis 106 intersects the second rotary axis 105. Preferably, the first rotation axis 106 is perpendicular to the first rotary axis 104 so as to facilitate the machining of the machine. The third guide assembly 161 includes a third guide member 1611 and a fourth guide member 1612. The third guide member 1611 rotates about a second rotation axis 107, the fourth guide member 1612 is adjacent to the third guide member 1611, and the fourth guide member 1612 rotates about a direction substantially parallel to the second rotation axis 107. The saw blade 180 is disposed between the third guide member 1611 and the fourth guide member 1612. The fourth guide assembly 162 includes a fifth guide member 1621 and a sixth guide member 1622. The fifth guide member 1621 and the third guide member 1611 are disposed substantially symmetrically with respect to the plane P2 and the fifth guide 1621 is rotatable in the direction substantially parallel to the second rotation axis 107. The sixth guide member 1622 is disposed adjacent to the fifth guide member 1621, the sixth guide member 1622 and the fourth guide member 1612 are disposed substantially symmetrical with respect to the plane P2, the sixth guide member 1622 is rotatable in the direction substantially parallel to the second rotation axis 107, and the saw blade 180 is disposed between the fifth guide member 1621 and the sixth guide member 1622. The first rotation axis 106 and the second rotation axis 107 intersect and form a preset angle α. When cutting the workpiece, the saw blade 180 is generally inclined to facilitate cutting in a gravity direction or in a direction intersecting the gravity direction, that is, the saw blade 180 moves in the second cutting direction c within the cutting area 114. The second rotation axis 107 substantially coincides with the second cutting direction c. In practice, however, in order to facilitate cutting the workpiece intersecting or even perpendicular to the gravity direction, the saw blade 180 moves in the first cutting direction b within the cutting area 114. The first rotation axis 106 substantially coincides with the first cutting direction b. The first rotation axis 106 and the second rotation axis 107 intersect and form a preset angle α which is less than or equal to 90 degrees. In this example, the preset angle a ranges from 20 degrees to 55 degrees, preferably, from 30 degrees to 45 degrees.

The first guide mechanism 150 and the second guide mechanism 160 are connected to an intermediate connection assembly 190 which is fixedly connected to the housing assembly 110. Specifically, the intermediate connection assembly 190 includes a first intermediate connection portion 191 and a second intermediate connection portion 192. The first guide assembly 151 and the second guide assembly 152 are mounted to the first intermediate connection portion 191 and the second intermediate connection portion 192 respectively. The first intermediate connection portion 191 and the second intermediate connection portion 192 are mounted to the first housing 111 and the second housing 112 respectively. The third guide assembly 161 and the fourth guide assembly 162 are mounted to the first intermediate connection portion 191 and the second intermediate connection portion 192 respectively. More specifically, the first intermediate connection portion 191 may be fastened to the first housing 111 with screws, and the second intermediate connection portion 192 may also be fastened to the second housing 112 with the screws. The stop mechanism 170 is connected to the intermediate connection assembly 190, and the first stopper 171 and the second stopper 172 are connected to the first intermediate connection portion 191 and the second intermediate connection portion 192 respectively.

Figure 8:
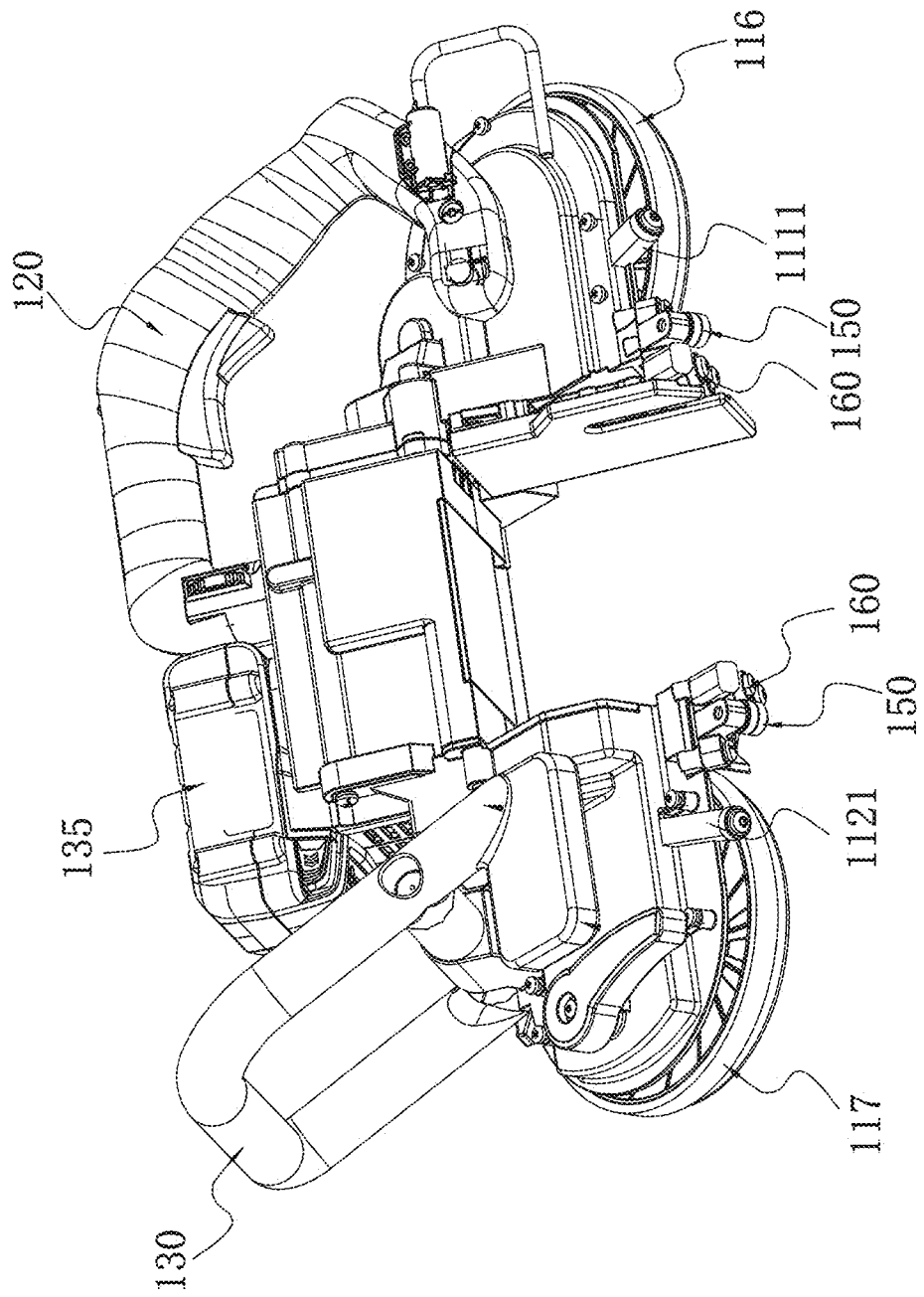
FIG. 8 is a structural view illustrating that an auxiliary handle of the hand-held band saw as shown in FIG. 1 is at an intermediate position of the handle.

As another optional example, as shown in FIG. 8, the first housing 111 includes a first extension portion 1111, the second housing 112 includes a second extension portion 1121. The first stopper 171 and the second stopper 172 are connected to the first extension portion 1111 and the second extension portion 1121 respectively, and the first guide mechanism 150 and the second guide structure 160 are connected to the intermediate connection assembly 190. Specifically, the first guide assembly 151 and the second guide assembly 152 are mounted to the first intermediate connection portion 191 and the second intermediate connection portion 192 respectively. The third guide assembly 161 and the fourth guide assembly 162 are mounted to the first intermediate connection portion 191 and the second intermediate connection portion 192 respectively.

Specifically, the first guide member 1511, the second guide member 1521, the third guide member 1611, the fourth guide member 1612, the fifth guide member 1621, the sixth guide member 1622, the first stopper 171 and the second stopper 172 are all rolling bearings. The first guide member 1511, the third guide member 1611 and the fourth guide member 1612 are fitted to the first intermediate connection portion 191 by the screws, and the second guide member 1521, the fifth guide member 1621 and the sixth guide member 1622 are fitted to the second intermediate connection portion 192 by the screws.

Referring to FIGS. 1 to 6, the hand-held band saw 100 also includes an auxiliary handle 130 for the user to grip. The auxiliary handle 130 is rotationally connected to the housing assembly 110. In this example, the auxiliary handle 130 is rotationally connected to the second housing 112, and of course, the auxiliary handle 130 may also be rotationally connected to the third housing 113. Specifically, the auxiliary handle 130 includes a first gripping portion 131, a second gripping portion 132 spaced from the first gripping portion 131, a third gripping portion 133, an auxiliary gripping portion 134, a coupling portion 136 and an extension portion 137. The third gripping portion 133 connects one end of the first gripping portion 131 and one end of the second gripping portion 132, the coupling portion 136 connects the other end of the first gripping portion 131 and the other end of the second gripping portion 132, the extension portion 137 is connected to one end, adjacent to the coupling portion 136, of the first gripping portion 131, the auxiliary gripping portion 134 is connected to the extension portion 137, and the auxiliary gripping portion 134 is located on an upper side of the second housing surface 1122. According to the above arrangement, when the hand-held band saw 100 is operated, the user can place the palm of the hand gripping the auxiliary handle 130 on the auxiliary gripping portion 134. Such way can not only maintain the stability of the body of the hand-held band saw 100 and prevent the case of the uneven cutting of the workpiece caused by the body waging from side to side, but also place the hand originally placed on the auxiliary handle on the auxiliary gripping portion, and release the gripping hand, so that the operation is much easier and labor-saving.

The auxiliary gripping portion 134 is fixedly connected or integrally formed with the extension portion 137, that is, the auxiliary gripping portion 134 is rotatable with respect to the housing assembly 110. In the specific operation, the user holds the handle 120 with one hand and laps the other hand on the auxiliary gripping portion 134, and the hand on the handle 120 controls an actuating device 220 to start the hand-held band saw 100 for the cutting work. According to the actual operation position of the cut workpiece, the user can adjust the operation in real time. The auxiliary gripping portion 134 is added on the structure of the auxiliary handle 130, so that the user can remove the arm that originally applied a force to the auxiliary handle 130 when cutting the workpiece, and thus avoiding the case where the arm blocks the sight, in particular, the case where the workpiece to be cut is in a relatively low position, the user needs to bend over to operate, and thus the arm of the hand gripping the auxiliary handle 130 can easily block the visual field of the user, thereby affecting the cutting accuracy of the user.

The handle 120 is disposed symmetrically with respect to the plane P1, and extension directions of the first gripping portion 131 and the second gripping portion 132 are both substantially parallel to the plane P1. An angle intersected by the plane P1 and the first housing surface 1112 ranges from 135 degrees to 155 degrees, preferably, from 140 degrees to 150 degrees. The plane P1 of the handle is substantially parallel to the second cutting direction c, that is, when the user operates the hand-held band saw 100 to cut the workpiece in the second cutting direction c, an extension direction of the handle 120 is consistent with the gravity direction of the machine at this time, thereby increasing the user's sense of experience and enabling the hand-held band saw 100 to be operated smoothly and cut normally.

The handle 120 includes a handle operation portion 126 for the user to operate the hand-held band saw 100. The hand-held band saw 100 has a preset plane P3, the first housing surface 1112 and the second housing surface 1122 are at least partially located in a preset plane P3, and a distance D1 from the handle 120 to the preset plane P3 in a direction perpendicular to the preset plane P3 is greater than a distance D2 from the auxiliary gripping portion 134 to the preset plane P3 in the direction perpendicular to the preset plane P3. The auxiliary gripping portion 134 is disposed on an upper side of the preset plane P3 and on a lower side of the handle operation portion 126. When the user grips the handle operation portion 126 with one hand, the other hand previously gripped the auxiliary handle 130 now can grip the auxiliary gripping portion 134 which is lower than the handle operation portion 126. In this case, when the user grips the hand-held band saw 100, the height of the machine can be lowered, the gravitational potential energy of the machine in the gravity direction can be lowered, and the user is in a relatively labor-saving state.

The user gripping the auxiliary gripping portion 134 also gives an auxiliary force to the body of the hand-held band saw 100 from a side direction, which is much easier and labor-saving for the user in operation, and does not need to lift or lower the body. The user may choose to hold a gripping top surface 1345 of the auxiliary gripping portion 134 to maintain the stability of the body; and may also lift the machine body from a gap between the auxiliary gripping portion 134 and the second housing surface 1122 to maintain the stability of the machine body and complete the machining operation. Based on the design of the structure of the auxiliary gripping portion 134, the original force applied vertically is changed into an auxiliary supporting force from the side, which is more conducive to maintaining the stability of the body of the hand-held band saw 100 during the cutting and preventing the case of the uneven cutting of the workpiece caused by the vibration of the machine during the cutting.

Figure 6:
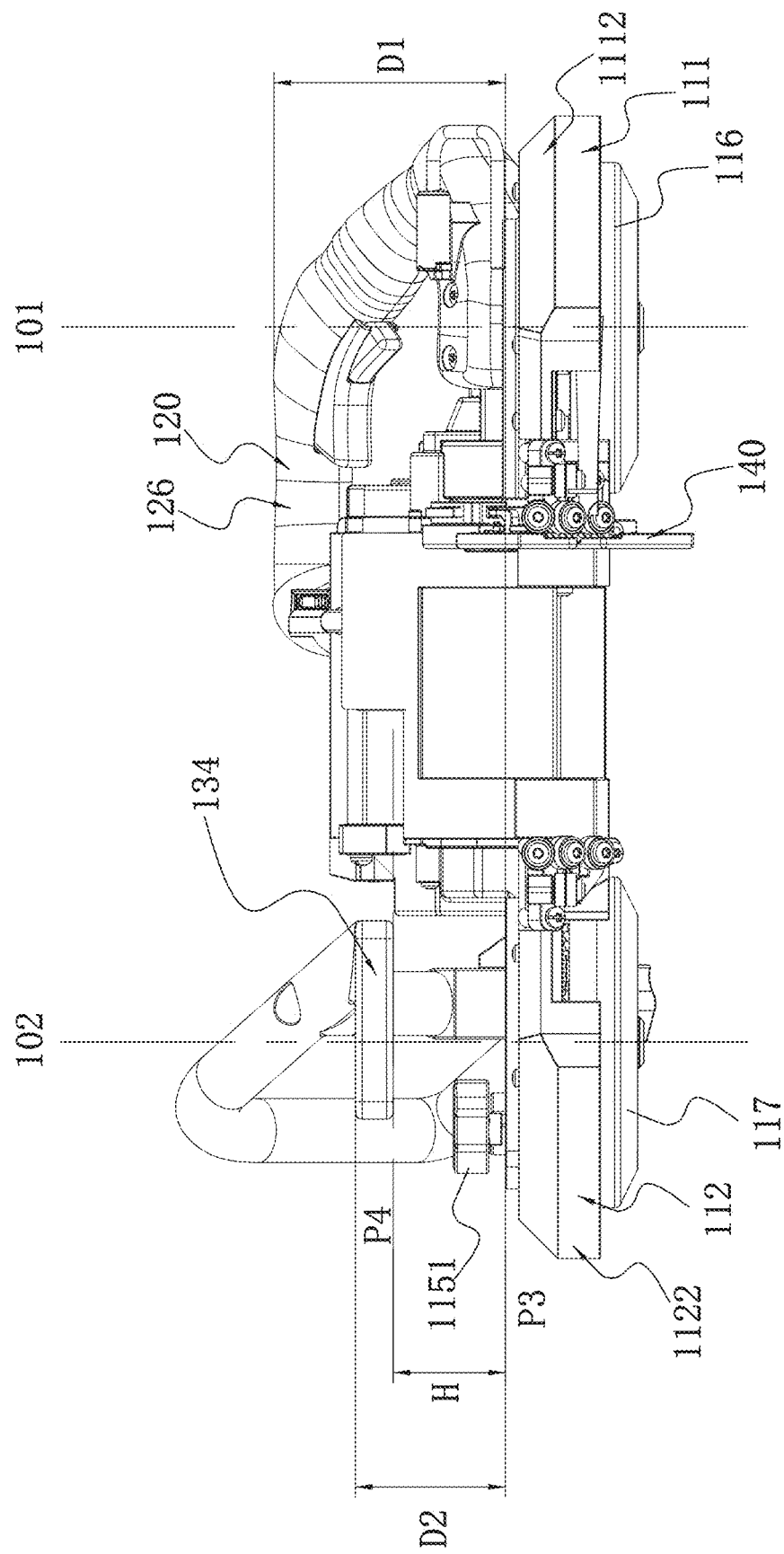
FIG. 6 is a front view of the hand-held band saw as shown in FIG. 1.
Figure 7:
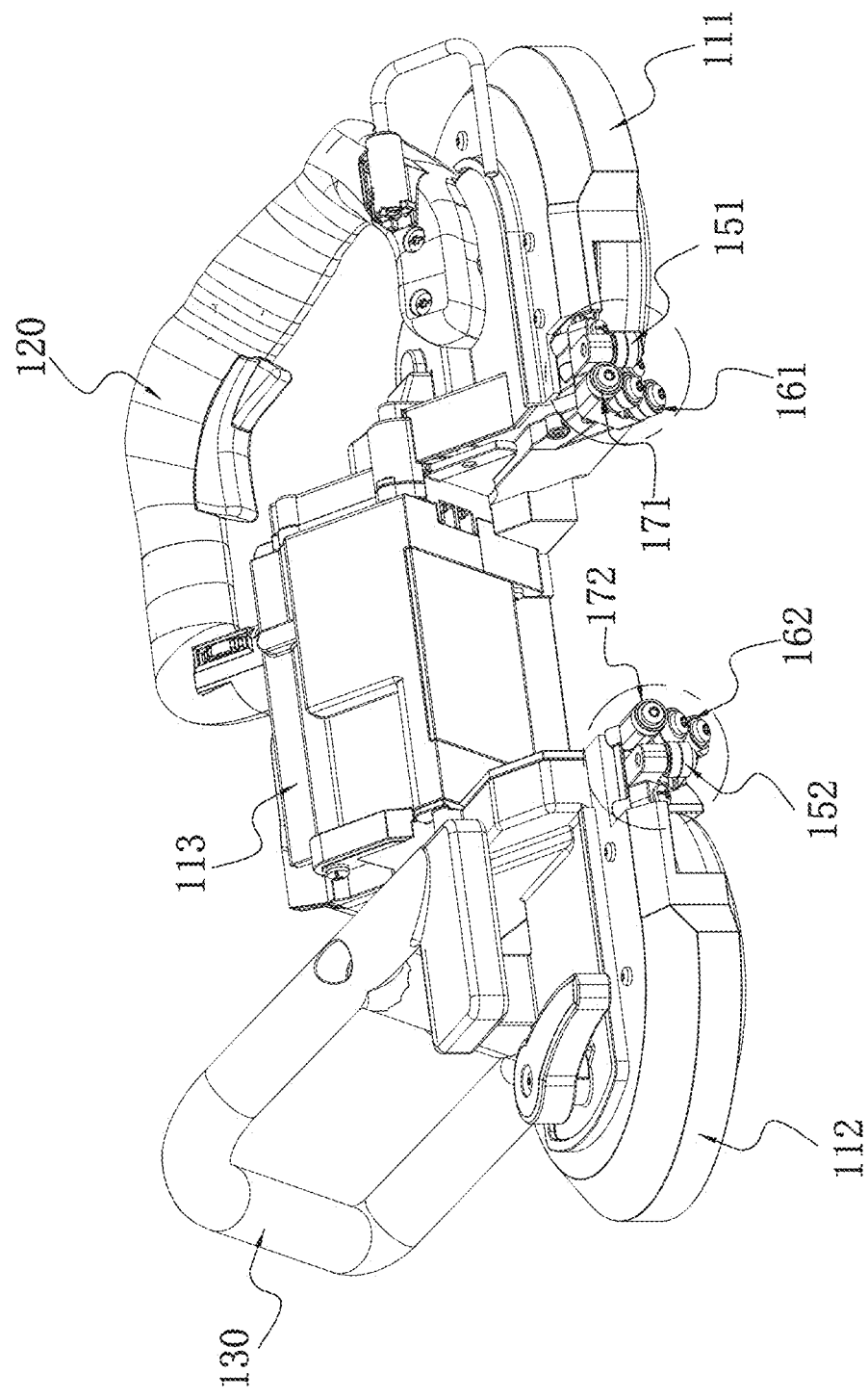
FIG. 7 is a structural view of a first guide mechanism and a second guide mechanism of the hand-held band saw as shown in FIG. 1.
Figure 9:
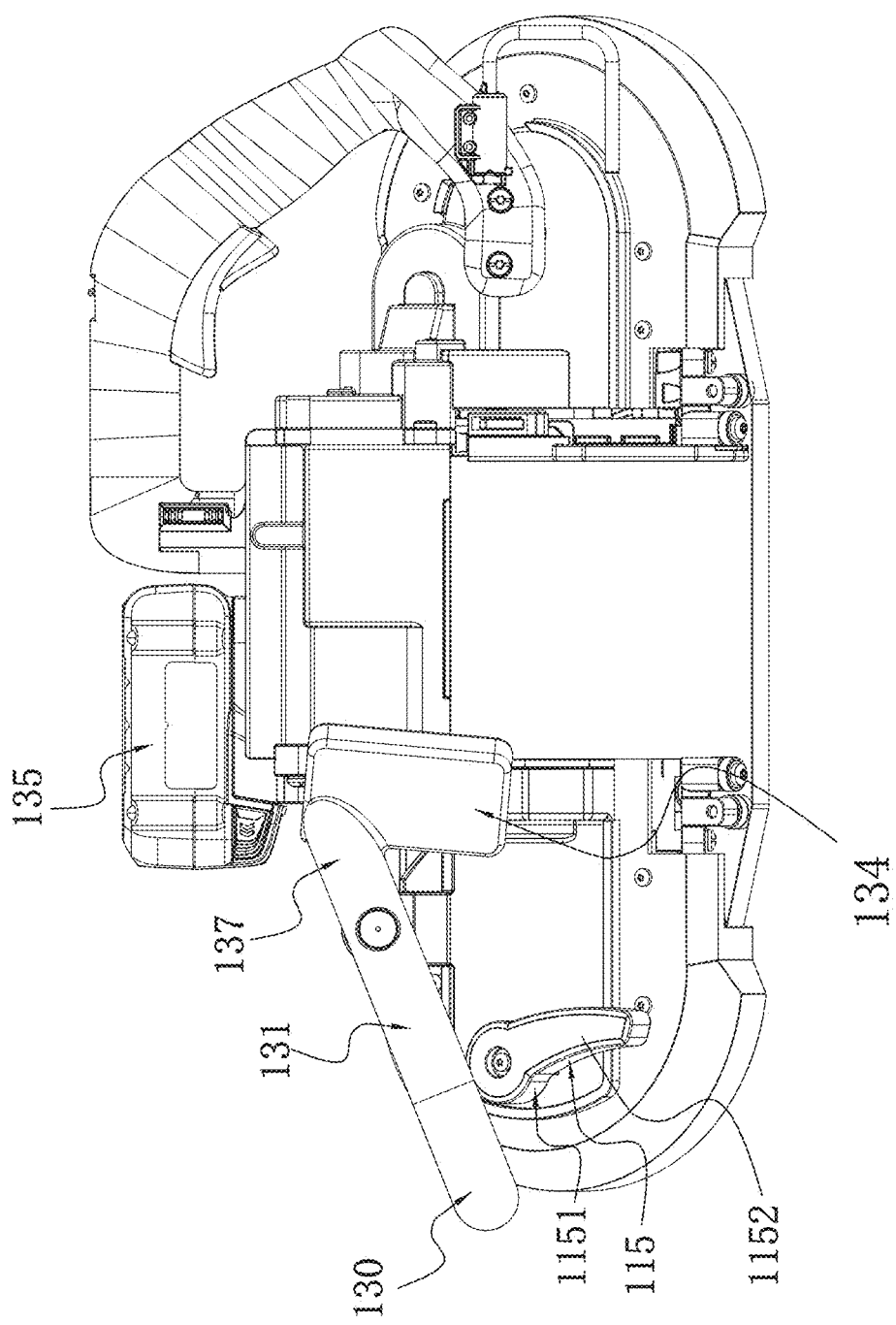
FIG. 9 is a structural view illustrating that the auxiliary handle of the hand-held band saw as shown in FIG. 1 is in a first extreme position.
Figure 10:
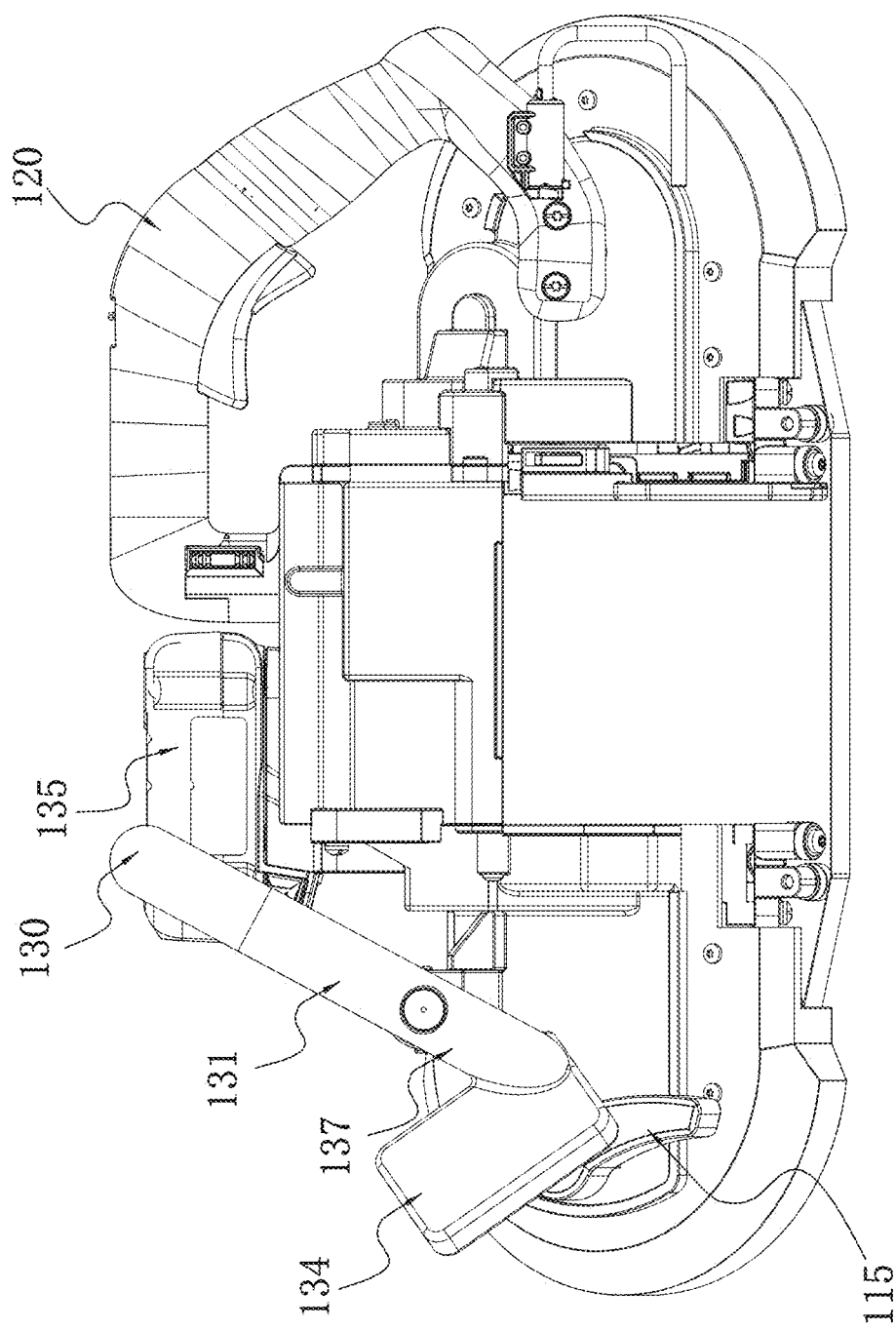
FIG. 10 is a structural view illustrating that the auxiliary handle of the hand-held band saw as shown in FIG. 1 is in a second extreme position.
Figure 11:
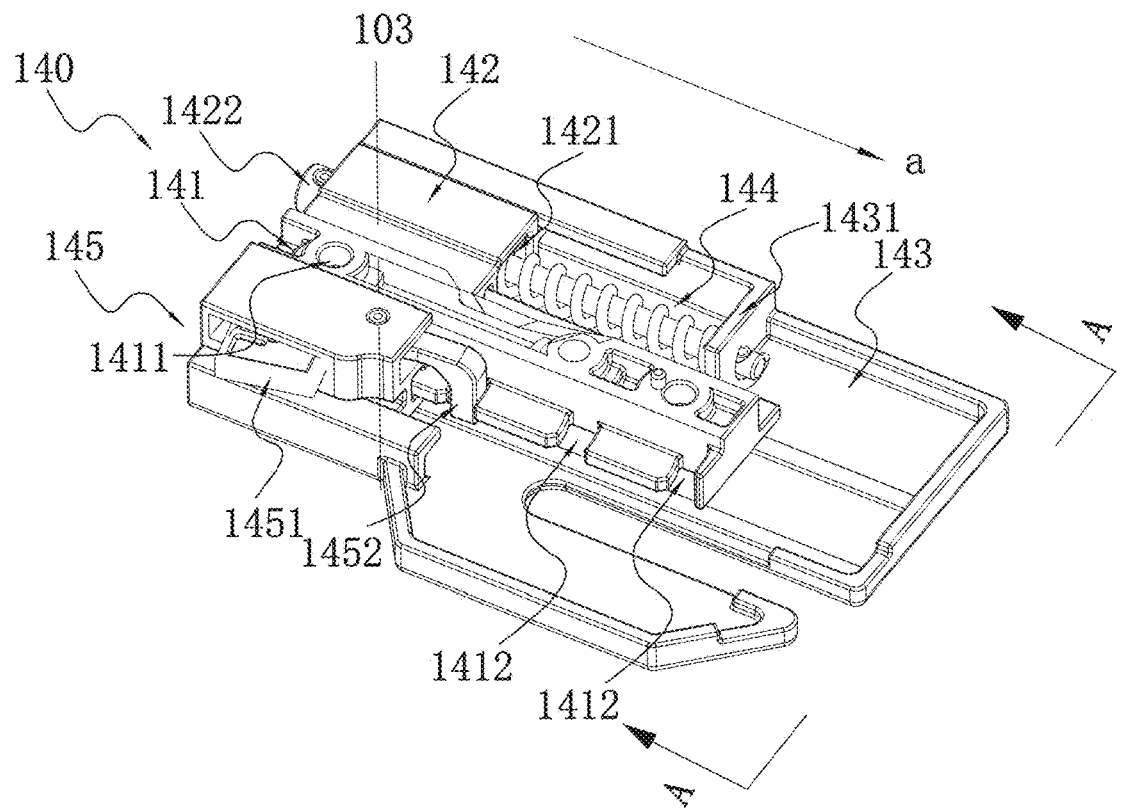
FIG. 11 is a structural view illustrating that the supporting device of the hand-held band saw as shown in FIG. 1 is in a first position.
Figure 12:
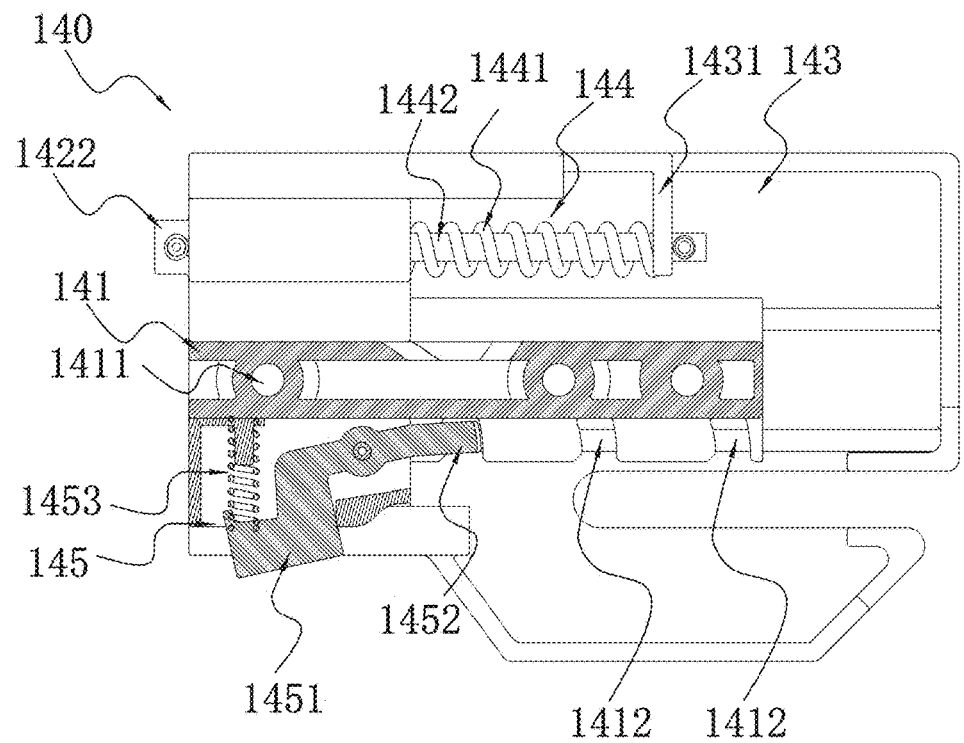
FIG. 12 is a sectional view taken along an A-A direction of FIG. 11.

Referring to FIGS. 6, 9, 10, 18 and 19, the auxiliary gripping portion 134 includes a first gripping side 1341, a second gripping side 1342 and a gripping bottom surface 1346. The first gripping side 1341 is disposed adjacent to the second gripping side 1342, and an extension portion 137 of the auxiliary handle 130 has one extension end which is fixedly connected or integrally formed with a part of the first gripping side 1341 adjacent to the second gripping side 1342, which is conductive to machining. The second housing surface 1122 has a central surface 1123 extending within a preset plane P3. The auxiliary handle 130 is rotatable about the rotation axis 108, a first extreme position and a second extreme position exist during the rotation of the auxiliary handle 130. The first extreme position is a position at which the auxiliary handle 130 is in contact with the second housing 112 (as shown in FIG. 9). The second extreme position is a position at which the auxiliary handle 130 is in contact with the battery pack 135 (as shown in FIG. 10), and at least one intermediate position of the handle (as shown in FIG. 6) exists between the first extreme position and the second extreme position such that the gripping bottom surface 1346 is substantially parallel to the central surface 1123 of the second housing surface 1122. As another example, the gripping bottom surface 1346 of the auxiliary gripping portion 134 is partially within a gripping plane P4. It can also be understood that the gripping bottom surface 1346 is not a plane and may be in other shapes. The gripping bottom surface 1346 is partially within the gripping plane P4, that is, the gripping plane P4 rotates along with the auxiliary gripping portion 134, and the first extreme position and the second extreme position also exist in the gripping plane P4 during the rotation. An intermediate position of the handle exists between the first extreme position and the second extreme position, so that the gripping plane P4 is substantially parallel to the central surface 1123 of the second housing surface 1122.

The hand-held band saw 100 further includes a tension assembly 115 for adjusting a position of the saw blade 180 so as to maintain a reasonable tension during the operation of the saw blade 180 and ensure the normal operation of the machine. The tension assembly 115 includes a switch knob 1151 which is rotationally connected to the second housing 112 and is disposed between the second housing surface 1122 and the auxiliary gripping portion 134 so as to prevent the switch knob 1151 from contacting the auxiliary gripping portion 134 during the rotation. More specifically, the switch knob 1151 has a top surface 1152. When the auxiliary handle 130 is at the intermediate position of the handle, a minimum distance from the gripping bottom surface 1346 of the auxiliary gripping portion 134 to the second housing surface 1122 in the direction perpendicular to the preset plane P3 is greater than a maximum distance from a top surface 1152 of the switch knob 1151 to the second housing surface 1122 in the direction perpendicular to the preset plane P3, which is convenient for the user to grip the auxiliary gripping portion 134 to keep the body stable, and can also leave a sufficient gap for the user to lift the auxiliary gripping portion 134 and the switch knob 1151 to complete the cutting operation.

When the auxiliary handle 130 is at the intermediate position of the handle, a length H from the gripping bottom surface 1346 to the central surface 1123 in the direction perpendicular to the preset plane P3 ranges from 28 mm to 70 mm during which the hand of the user does not touch the switch knob 1151, so that when the auxiliary gripping portion 134 is gripped, the switch knob 1151 cannot be unusable, thereby improving the user experience.

Referring to FIGS. 2, 6, 18 and 19, the auxiliary gripping portion 134 also includes a third gripping side 1343 disposed opposite to the first gripping side 1341, a fourth gripping side 1344 disposed opposite to the second gripping side 1342, and a gripping top surface 1345 connected to the first gripping side 1341, the second gripping side 1342, the third gripping side 1343, and the fourth gripping side 1344, and the gripping top surface 1345 is disposed opposite to the gripping bottom surface 1346. The extension end is at least partially connected to the gripping top surface 1345. When the auxiliary handle 130 is at the intermediate position of the handle, the first gripping side 1341, the second gripping side 1342, the third gripping side 1343 and the fourth gripping side 1344 are substantially perpendicular to the preset plane P3, and the gripping top surface 1345 is approximately arc-shaped, so that when the hand-held band saw 100 is used by the user, it can be well fitted to the palm of the user, improving the user experience. Of course, we can understand that the gripping top surface 1345 and the gripping bottom surface 1346 of the auxiliary gripping portion 134 are both planar. As another example, the gripping top surface 1345 and the gripping bottom surface 1346 may not be planar. For example, the gripping bottom surface 1346 is configured to be concave to facilitate the user's grip, and the gripping top surface 1345 is convex to facilitate placing the user's palm. With the above design, the auxiliary gripping portion 134 may be a hexahedron, which facilitates the machining. In this example, the auxiliary gripping portion 134 is a hexahedron, and of course, the auxiliary gripping portion 134 may be in other shapes.

Joints of the four gripping sides are arc angles, which can improve the comfort of user when gripping. A rubber anti-slip layer is arranged on the gripping top surface 1345 of the auxiliary gripping portion 134, and the arrangement of the rubber anti-slip layer is more beneficial to improving the operation feeling of the user in the cutting operation. When the rubber layer is not provided on the user's operating glove, the rubber anti-slip layer on the gripping top surface 1345 can effectively prevent the user's hand from slipping off Referring to FIGS. 1 to 4, the hand-held band saw further includes the actuating device 220 for driving the motor 200, and the actuating device 220 is disposed adjacent to the handle operation portion 126. Specifically, referring to FIGS. 22 to 24, the actuating device 220 includes a switch assembly 221, a first pressing member 222 and a second pressing member 223. The switch assembly 221 is coupled to the motor 200 and the switch assembly 221 is configured to control whether the motor 200 is actuated or not. The first pressing member 222 is configured to control the switch assembly 221 and the second pressing member 223 is configured to control the switch assembly 221. That is to say, the first pressing member 222 and the second pressing member 223 may control the switch assembly 223 separately, thereby actuating the motor 200.

The first pressing member 222 is movably connected to the handle 120. The first pressing member 222 during the movement has at least a first actuating position for actuating the motor 200 and a first stopping position for stopping the motor 200. The second pressing member 223 is movably connected to the handle 120. The second pressing member 223 during the movement has at least a second actuating position for actuating the motor 200 and a second stopping position for stopping the motor 200. That is, the motor 200 may be actuated by any one of the first pressing member 222 or the second pressing member 223, and of course, the motor 200 may be actuated by simultaneously operating the first pressing member 222 and the second pressing member 223. To explain here, the first actuating position and the first stopping position are positions where the first pressing member 222 drives the switch assembly 221 to start and stop the motor 200 respectively. Similarly, the second actuating position and the second stopping position are positions where the second pressing member 223 drives the switch assembly 221 to start and stop the motor 200 respectively. The positions where the motor 200 is started or stopped each time may not be fixed as long as the function of actuating or stopping the motor 200 can be achieved. The first pressing member 222 and the second pressing member 223 may be driven in a contact mode or in a non-contact mode. When the hand-held band saw 100 is used by the user, the user may operate the first pressing member 222 and/or the second pressing member 223 with one hand, thereby facilitating the user's operation.

Figure 22:
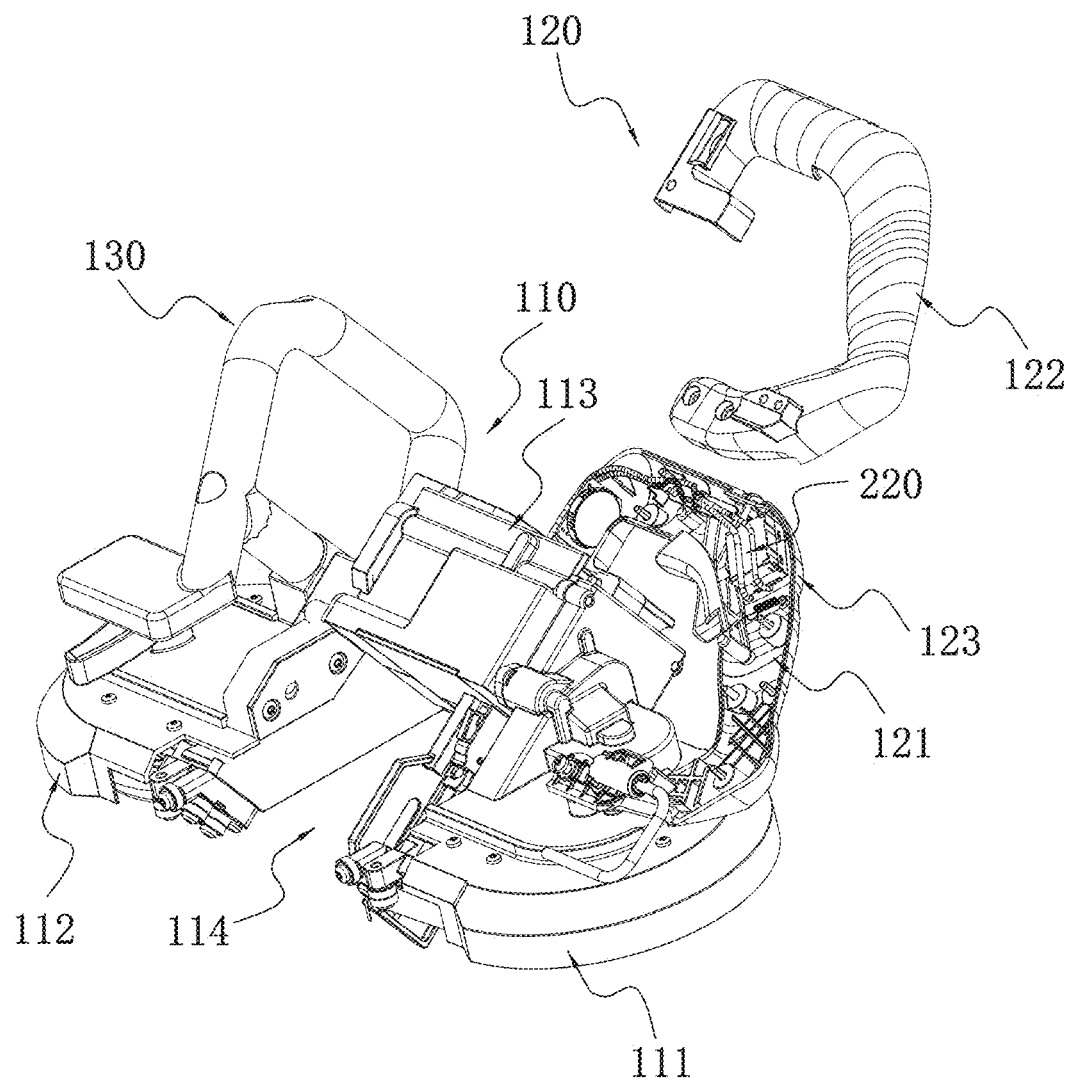
FIG. 22 is an exploded view of the auxiliary handle of the hand-held band saw as shown in FIG. 1.
Figure 23:
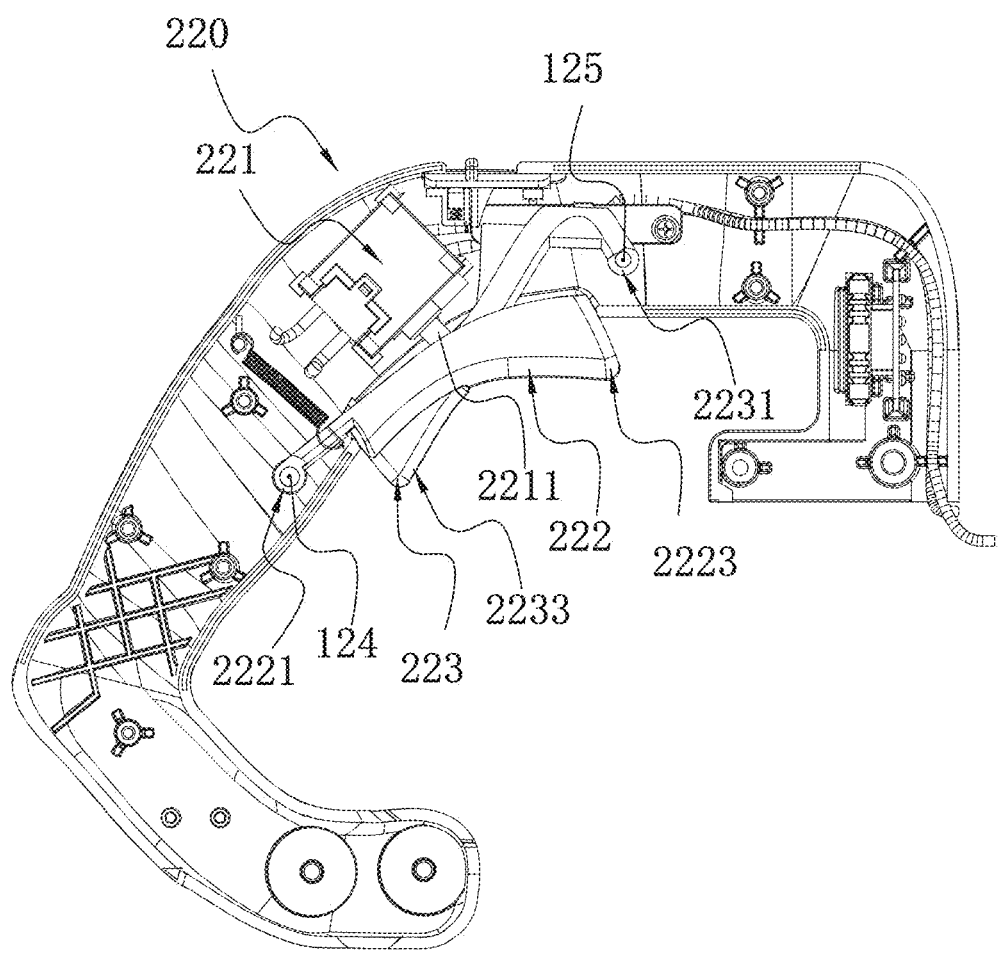
FIG. 23 is a structural view of an actuating device of the hand-held band saw as shown in FIG. 20.
Figure 24:
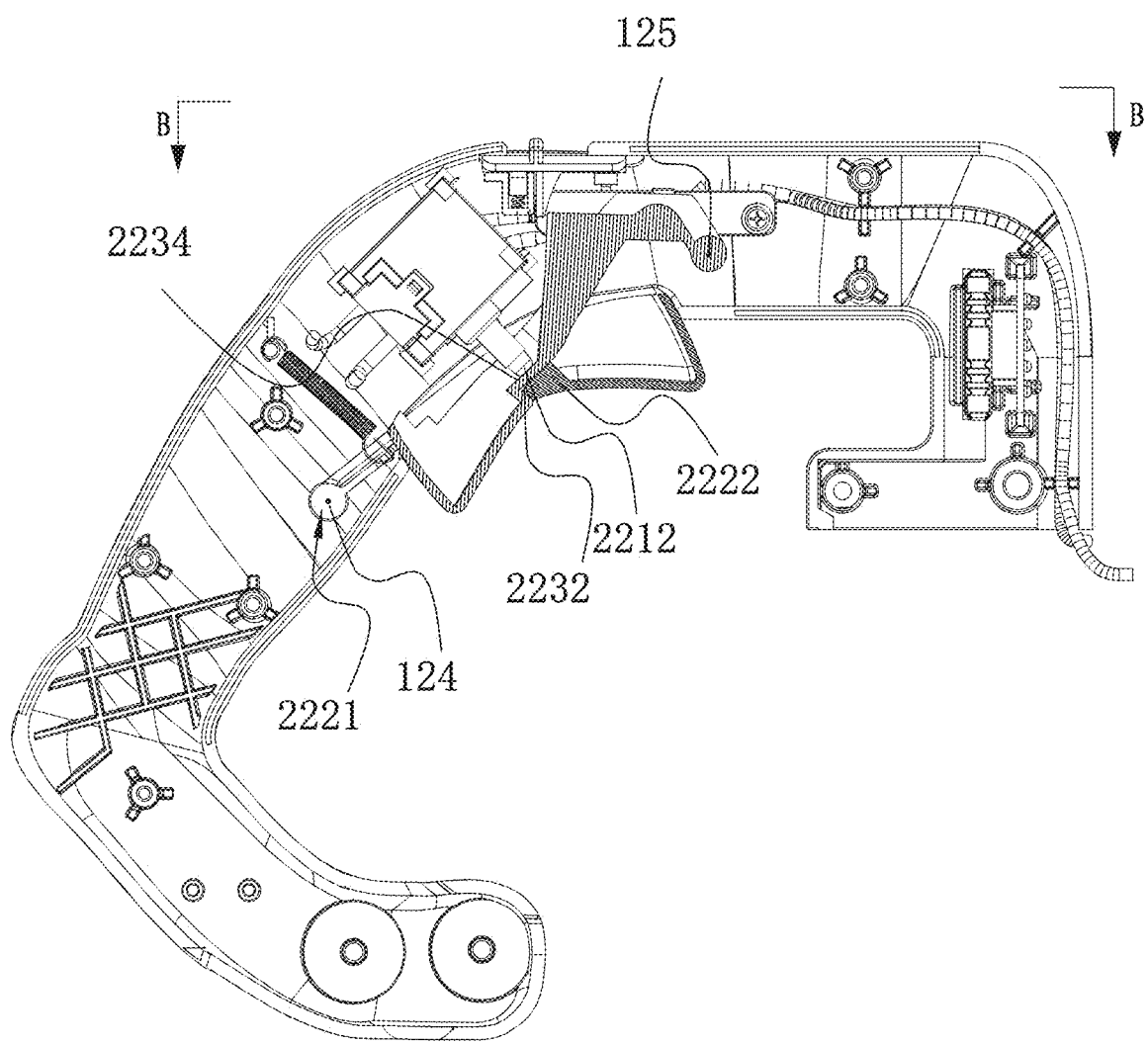
FIG. 24 is a sectional view taken along a B-B direction of FIG. 21.

Referring to FIGS. 22 to 24, the handle 120 has an accommodation cavity 121 formed by a left half housing 122 and a right half housing 123. The switch assembly 221 is disposed in the accommodation cavity 121, the first pressing member 222 is at least partially disposed in the accommodation cavity 121, the first pressing member 222 is connected to the handle 120, the first pressing member 222 is rotated about a first axis 124 with respect to the handle 120. Specifically, one end of the first pressing member 222 is mounted on the left half housing 122 and the other end of the first pressing member 222 is freely movable. Moreover, the second pressing member 223 is also at least partially disposed in the accommodation cavity 121, and is connected to the handle 120. The second pressing member 223 is rotated about a second axis 125 with respect to the handle 120. Specifically, one end of the second pressing member 223 is mounted on the left half housing 122, and the other end of the second pressing member 223 is freely movable. Whether the first pressing member 222 and the second pressing member 223 are specifically connected to the right half housing 123 or the left half housing 122 is not limited in the present application. It is to be noted that the position connected to one end of the first pressing member 222 is referred to as a first connection point 2221, and the position connected to one end of the second pressing member 223 is referred to as a second connection point 2231.

The first pressing member 222 rotates from the first stopping position to the first actuating position, and drives the second pressing member 223 from the second stopping position to the second actuating position. Specifically, the user drives the first pressing member 222, so that the first pressing member 222 drives the second pressing member 223 to approach the switch assembly 221, so that the second pressing member 223 is at the second actuating position, thereby actuating the machine. As an optional manner, when the user drives the second pressing member 223, the second pressing member 223 approaches the switch assembly 221 so that the second pressing member 223 is at the second actuating position, in this case, the first pressing member 222 is still at the first stopping position. As other optional manners, the second pressing member 223 rotates from the second stopping position to the second actuating position, drives the first pressing member 222 to move from the first stopping position to the first actuating position. Specifically, the user operates the second pressing member 223, so that the second pressing member 223 approaches to the switch assembly 221, and drives the first pressing member 222 to move from the first stopping position to the first actuating position. In this way, the motor 200 can be actuated by the user regardless of operating the first pressing member 222 or the second pressing member 223. The first pressing member 222 and the second pressing member 223 are provided, so that the user can select an appropriate operation position in real time according to the position of the workpiece to be cut, especially when the workpiece to be cut is at a relatively difficult position to operate, the two pressing members give the user more choices and greatly improve the operation hand feeling of the user.

Figure 4:
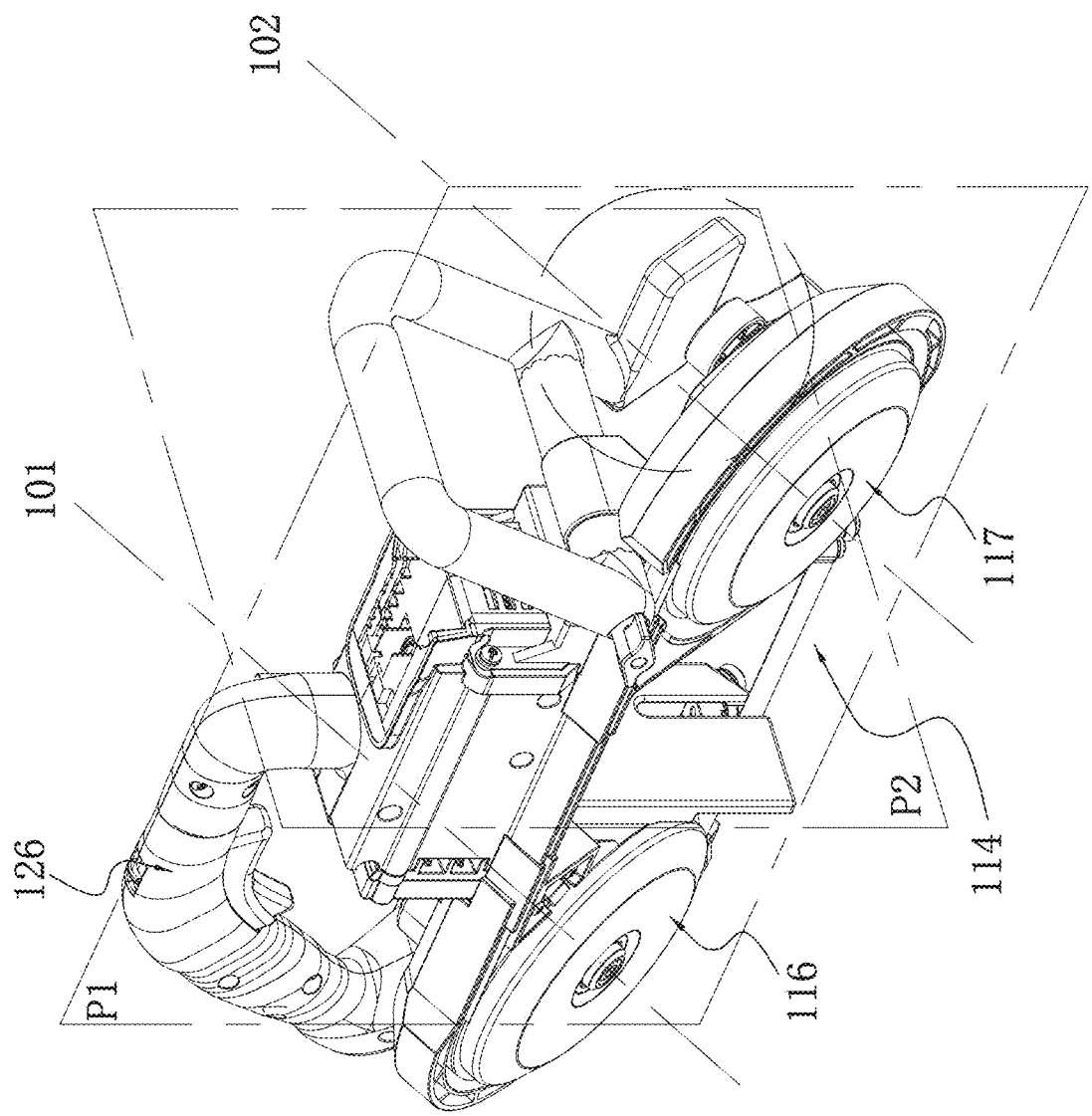
FIG. 4 is a three-dimensional structural view of a back of the hand-held band saw as shown in FIG. 1.
Figure 5:
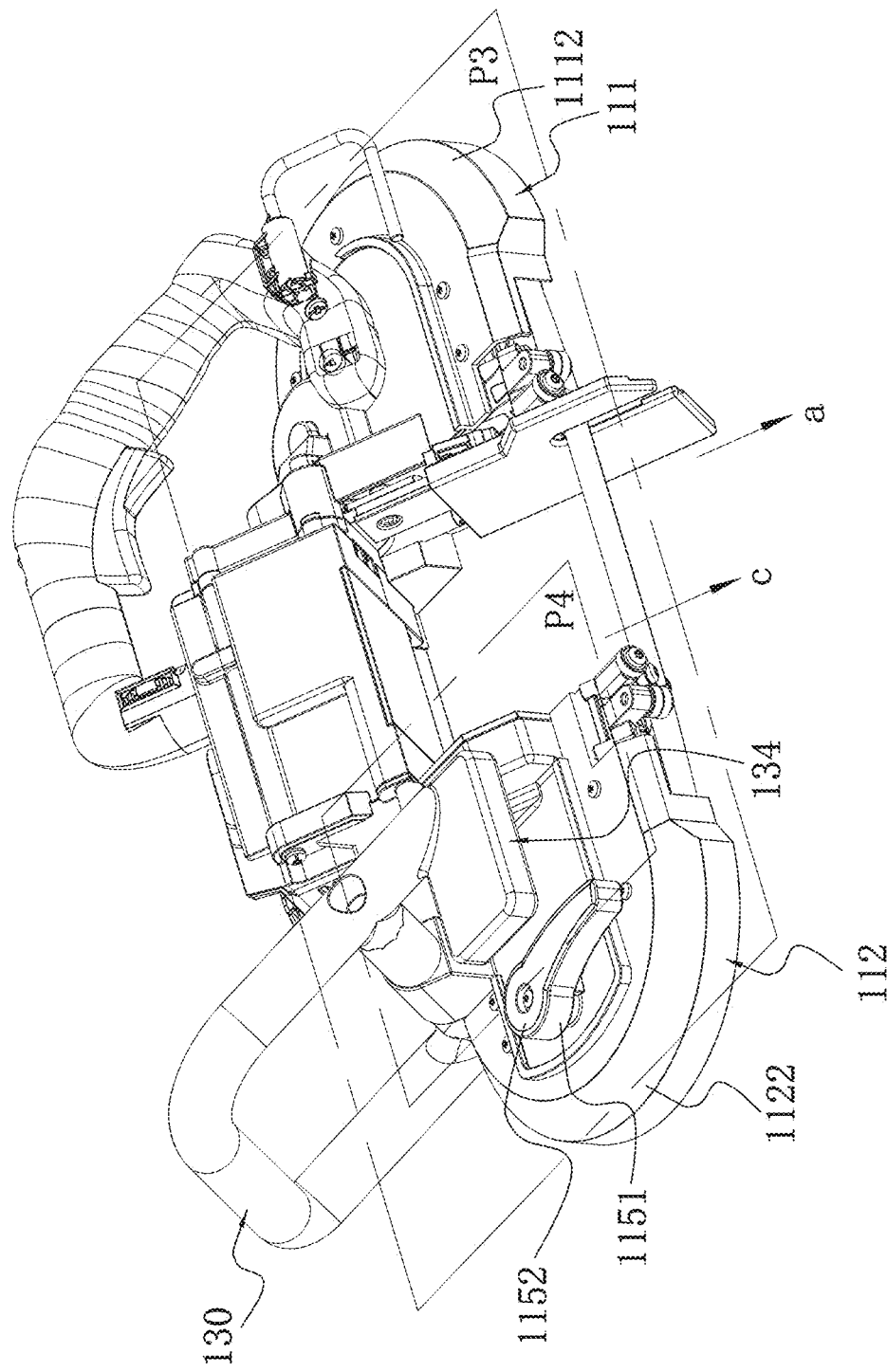
FIG. 5 is a structural view illustrating that an supporting device of the hand-held band saw as shown in FIG. 1 is in a second position.
Figure 21:
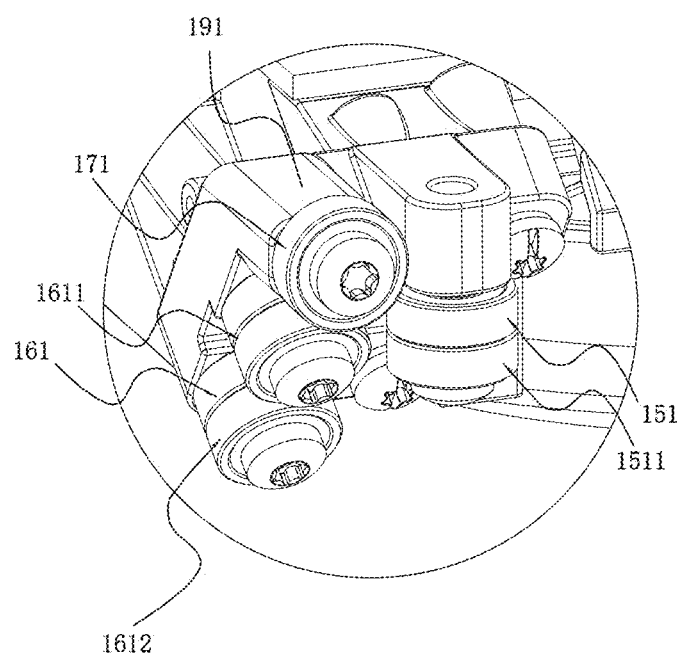
FIG. 21 is a partial enlarged view of FIG. 7.

Referring to FIGS. 4 and 21, a longest distance from the first pressing member 222 to the first axis 124 is substantially equal to a longest distance from the second pressing member 223 to the second axis 125, and the first axis 124 is substantially parallel to the second axis 125. Specifically, the first axis 124 and the second axis 125 are substantially perpendicular to the plane P1. A projection distance from the first pressing member 222 to the first connection point 2221 on the plane P1 is substantially equal to a projection distance from the second pressing member 223 to the second connection point 2231 on the plane P1, and the first pressing member 222 and the second pressing member 223 when pressed have the substantially same torque. The first axis 124 and the second axis 125 are perpendicular to the handle plane P1 separately.

The hand-held band saw 100 further includes a second elastic member. One end of the second elastic member is fixedly connected to the handle 120 and the other end of the second elastic member is connected to the first pressing member 222. The second elastic member is disposed in the accommodation cavity 121. Specifically, one end of the second elastic member is fixedly connected to the handle 120. Whether one end of the second elastic member is arranged on the left half housing 122 or the right half housing 123 is not limited herein. In this example, one end of the second elastic member is fixedly connected to the left half housing 122. The other end of the second elastic member is connected to the first pressing member 222. The second elastic member may specifically be a spring. When the user presses the second pressing member 223, the first pressing member 222 moves together with the second pressing member 223 under the action of a pre-tightening force of the spring. When the user removes the pressing force on the second pressing member 223, the second pressing member 223 returns to the second stopping position under the action of the switch assembly 221. In this way, the second pressing member 223 drives the first pressing member 222 to return to the first stopping position. The above design is simple in structure and easy to be achieved.

Referring to FIG. 24, the first pressing member 222 has a protrusion 2222, and the second pressing member 223 has a groove 2232. The protrusion 2222 cooperates with the groove 2232 so that the second pressing member 223 pushes the first pressing member 222 to rotate. Specifically, the user presses the first pressing member 222, the protrusion 2222 approaches the groove 2232 and pushes the second pressing member 223 closer to the switch assembly 221, thereby actuating the motor 200. When the user removes the pressing force on the first pressing member 222, the second pressing member 223 returns to the second stopping position under the action of the switch assembly 221, and the groove 2232 of the second pressing member 223 pushes the protrusion 2222 so as to make the first pressing member 222 return to the first stopping position.

A distance between the protrusion 2222 of the first pressing member 222 and the first axis 124 in a direction perpendicular to the first axis 124 is substantially equal to a distance between the groove 2232 of the second pressing member 223 and the second axis 125 in a direction perpendicular to the second axis 125. That is, a projection distance from the protrusion 2222 to the first axis 124 on the plane P1 is substantially equal to a projection distance from the groove 2232 to the second axis 125 on the plane P1. The above design has an advantage that a counterforce of the switch assembly 221 to the first pressing member 222 or the second pressing member 223 is substantially the same.

The first pressing member 222 has a first pressing surface 2223, and the second pressing member 223 has a second pressing surface 2233. The first pressing surface 2223 is substantially arc-shaped, the second pressing surface 2233 is substantially arc-shaped, and the first pressing surface 2223 is adjacent to the second pressing surface 2233. Specifically, the user presses the first pressing surface 2223 or the second pressing surface 2233 to drive the first pressing member 222 or the second pressing member 223. That is, the first pressing member 222 is overlapped with the second pressing member 223, the protrusion 2222 of the first pressing member 222 and the groove 2232 of the second pressing member 223 are an overlap of the first pressing member 222 and the second pressing member 223. A projection distance from the protrusion 2222 to the first connection point 2221 on the plane P1 is less than a projection distance from the first pressing member 222 to the first connection point 2221 on the plane P1. Similarly, a projection distance from the groove 2232 to the second connection point 2231 on the plane P1 is less than a projection distance from the second pressing member 223 to the second connection point 2231 on the plane P1. It can be understood that when the force is applied to the second pressing surface 2233, the force is extended and applied to the second pressing member 223, so that the second pressing member 223 rotates about the second axis 125. When the counterforce of the switch assembly 221 to the second pressing member 223 is applied to the second pressing surface 2233, a distance between the second axis 125 and the second pressing surface 2233 is greater than a distance between the groove 2232 and the second axis 125, that is, a force arm of the second pressing member 223 is greater than a force arm of the counterforce force, so that the force arm of the user acting on the second pressing member 223 is prolonged and the pressing is more labor-saving. Similarly, the first pressing member 222 also has the same principle, which is not repeated herein.

The first pressing surface 2223 and the second pressing surface 2233 are substantially continuous. That is, the first pressing surface 2223 and the second pressing surface 2233 are basically arc-shaped. The user can not only activate the motor 200 by pressing either the first pressing surface 2223 or the second pressing surface 2233, but also press the overlap of the first pressing surface 2223 and the second pressing surface 2233 to actuate the motor 200. With the above arrangement, the pressing area of the actuating device 220 is increased, so that the user can select an appropriate gripping angle according to the user's own gripping habit, thereby improving the use safety of the hand-held band saw 100 while facilitating the user's operation.

The switch assembly 221 includes an actuating element 2211 for touching the motor 200. The actuating element 2211 has a triggering portion 2212 which cooperates with the second pressing member 223. The second pressing member 223 has triggering surface 2234. When the second pressing member 223 moves from the second stopping position to the second actuating position, the triggering surface 2234 cooperates with the triggering portion 2212 so that the actuating element 2211 triggers the motor 200 to actuate, and the triggering portion 2212 is disposed adjacent to the triggering surface 2234. Specifically, the user presses any one of the first pressing member 222 and the second pressing member 223, so that the triggering surface 2234 pushes the triggering portion 2212 to actuate the motor 200. When the user withdraws the external force, the actuating element 2211 is restored, that is, the triggering portion 2212 pushes the triggering surface 2234 to make the second pressing member 223 return to the second stopping position.

As other optional examples, the actuating device 220 may also be arranged on power tool products such as an electric circular saw, a reciprocating saw, a multi-functional tool, an electric drill, an electric router and the like. The specific structure is not described here in detail.

The above are just preferred examples of the present application and the scope of the present application is not limited by the above examples. However, any equivalent modifications or changes made by those skilled in the art according to the contents disclosed in the present application should be within the scope described by the claims.

What is claimed is:

1. A hand-held band saw, comprising:
a first rotation wheel;
a second rotation wheel;
a housing assembly comprising a first housing for supporting the first rotation wheel, a second housing for supporting the second rotation wheel and spaced from the first housing, and a third housing connecting the first housing to the second housing, wherein a cutting area is formed between the first housing and the second housing;
a motor disposed in the housing assembly and capable of driving at least one of the first rotation wheel or the second rotation wheel to rotate; and
a support connected to the first housing and at least partially disposed in the cutting area, the support having a surface for supporting a workpiece;
wherein the support comprises:
a fixing member fixedly connected to the first housing;
a slider slidably connected to the fixing member;
a supporting member connected to the slider; and
a connector connecting the slider and the supporting member, wherein, when the slider moves, the connector enables the supporting member to move along with the slider to a second position and stay at the second position; and
wherein the connector comprises a buffer member mounted between the slider and the supporting member, and when the supporting member is at the second position, the buffer member allows the supporting member to move relative to the first housing and then drives the supporting member to move back to the second position.

2. The hand-held band saw of claim 1, wherein the support further comprises a control assembly mounted to the slider and the control assembly is connected to the fixing member and configured to prevent the slider from disengaging from the fixing member.

3. The hand-held band saw of claim 2, wherein a whole of the supporting member and the slider is capable of moving between a first position and a second position with respect to the fixing member in a first sliding direction, at least one intermediate position exists between the first position and the second position, and the whole of the supporting member and the slider is capable of being kept at the at least one intermediate position.

4. The hand-held band saw of claim 3, wherein the control assembly comprises a stopper capable of cooperating with the fixing member, the slider is configured to be fixed with respect to the fixing member when the stopper is in contact with the fixing member, and the slider is capable of moving with respect to the fixing member when the stopper is disengaged from the fixing member.

5. The hand-held band saw of claim 4, wherein the fixing member is provided with a plurality of grooves, the stopper is capable of meshing with the plurality of grooves, and, in a case where the slider is in the first position, the second position, or the at least one intermediate position and the stopper is meshing with the plurality of grooves, the slider is fixed with respect to the fixing member.

6. The hand-held band saw of claim 4, wherein the control assembly further comprises a control button for a user to operate to drive the stopper to disengage with the fixing member and an elastic member configured to reset the control button.

7. The hand-held band saw of claim 6, wherein the control button is integrally formed with the stopper.

8. The hand-held band saw of claim 3, wherein, when the supporting member is forced to move to a third position relative to the slider at the intermediate position, the first position, or the second position, the buffer member is capable of generating a buffer force and the buffer force is capable to enabling the supporting member to have a tendency to move from the third position to the intermediate position, the first position, or the second position.

9. The hand-held band saw of claim 3, wherein the connector comprises a guide rod disposed along the first sliding direction and connected to the slider and the buffer member is sleeved on the guide rod.

10. The hand-held band saw of claim 9, wherein the buffer member is a spring.

11. The hand-held band saw of claim 9, wherein the supporting member is provided with a protrusion extending in a direction perpendicular to the first sliding direction, one end of the guide rod is connected to the slider, and another end of the guide rod is connected to the protrusion.

12. A band saw, comprising:
a first rotation wheel;
a second rotation wheel;
a housing assembly comprising a first housing for supporting the first rotation wheel, a second housing for supporting the second rotation wheel and spaced from the first housing, and a third housing connecting the first housing to the second housing, wherein a cutting area is formed between the first housing and the second housing;
a motor disposed in the housing assembly and capable of driving at least one of the first rotation wheel or the second rotation wheel to rotate; and
a support connected to the first housing, the support having a surface for supporting a workpiece;
wherein the support comprises:
a fixing member fixedly connected to the first housing;
a slider slidably connected to the fixing member;
a supporting member connected to the slider; and
a connector connecting the slider and the supporting member;

wherein the connector enables the supporting member to move with the slider when the slider moves, and the connector comprises a buffer member mounted between the slider and the supporting member, and the connector is further configured to allow the supporting member to move relative to the slider via the buffer member.

13. The band saw of claim 12, wherein a whole of the supporting member and the slider is capable of moving between a first position and a second position with respect to the fixing member in a first sliding direction, at least one intermediate position exists between the first position and the second position, and the whole of the supporting member and the slider is capable of being kept at the at least one intermediate position.

14. The band saw of claim 13, wherein the fixing member is provided with a plurality of grooves, the support further comprises a stopper capable of meshing with the plurality of grooves, and, in a case where the slider is in the first position, the second position, or the at least one intermediate position and the stopper is meshing with the plurality of grooves, the slider is fixed with respect to the fixing member.

15. The band saw of claim 14, wherein the support further comprises an operation member for a user to operate to drive the stopper to disengage with the plurality of grooves.

16. The band saw of claim 15, wherein the operation member is further configured to drive the slider to move and the operation member is mounted to the slider.

17. The band saw of claim 12, wherein the connector comprises a buffer member connecting the slider and the supporting member and configured to bias the supporting member.

18. The band saw of claim 17, wherein the buffer member is a spring.

19. The band saw of claim 18, wherein, when the supporting member moves relative to the slider under a force, the buffer member is capable of generating a buffer force opposite to a moving direction of the supporting member.

20. The band saw of claim 18, wherein the connector comprises a guide rod connecting with the slider and supporting member and the spring is sleeved on the guide rod.

* * * * *